(12) United States Patent
Nakamura

(10) Patent No.: US 10,127,031 B2
(45) Date of Patent: Nov. 13, 2018

(54) METHOD FOR UPDATING A PROGRAM ON A COMMUNICATION APPARATUS

(71) Applicant: Shigeru Nakamura, Kanagawa (JP)

(72) Inventor: Shigeru Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/535,750

(22) Filed: Nov. 7, 2014

(65) Prior Publication Data
US 2015/0149990 A1     May 28, 2015

(30) Foreign Application Priority Data

Nov. 26, 2013    (JP) ................................. 2013-244348

(51) Int. Cl.
| | | |
|---|---|---|
| G06F 9/44 | (2018.01) | |
| G06F 8/65 | (2018.01) | |
| H04L 29/08 | (2006.01) | |
| H04W 4/50 | (2018.01) | |

(52) U.S. Cl.
CPC ................ *G06F 8/65* (2013.01); *H04L 67/34* (2013.01); *H04W 4/50* (2018.02)

(58) Field of Classification Search
None
See application file for complete search history.

(56) References Cited

U.S. PATENT DOCUMENTS

| | | | |
|---|---|---|---|
| 6,151,643 A | 11/2000 | Cheng et al. | |
| 6,263,491 B1 * | 7/2001 | Hunt | ......................... G06F 9/465 |
| | | | 717/130 |
| 6,457,076 B1 | 9/2002 | Cheng et al. | |
| 6,578,142 B1 | 6/2003 | Anderson et al. | |
| 6,687,901 B1 * | 2/2004 | Imamatsu | ................ G06F 8/65 |
| | | | 455/418 |
| 7,028,077 B2 | 4/2006 | Toshimitsu et al. | |

(Continued)

FOREIGN PATENT DOCUMENTS

| | | |
|---|---|---|
| EP | 0 811 942 A2 | 12/1997 |
| JP | H07-104991 | 4/1995 |

(Continued)

OTHER PUBLICATIONS

Microsoft. "Change how Windows installs or notifies you about updates." Microsoft Windows. N.p., Jun. 25, 2009. Web. Apr. 21, 2016. <http://windows.microsoft.com/en-us/windows/change-windows-update-installation-notification#1TC=windows-7>.*

(Continued)

*Primary Examiner* — Wei Y Zhen
*Assistant Examiner* — Binh K Luu
(74) *Attorney, Agent, or Firm* — Oblon, McClelland, Maier & Neustadt, L.L.P.

(57) ABSTRACT

A communication apparatus includes a receiver configured to receive metadata, the metadata including information associated with update data capable of being executed after the receiver has received the metadata, and a determination part configured to determine whether an update of the update data is executable in accordance with the metadata. When the determination part has determined that the update is executable, the update is executed.

6 Claims, 16 Drawing Sheets

(56) References Cited

U.S. PATENT DOCUMENTS

| | | | |
|---|---|---|---|
| 7,523,452 B1* | 4/2009 | Kamity | G06F 8/65 717/178 |
| 8,010,958 B2 | 8/2011 | Tanaka | |
| 8,171,560 B2 | 5/2012 | Reus | |
| 8,209,676 B2 | 6/2012 | Kapadekar | |
| 8,271,630 B2 | 9/2012 | Gao | |
| 8,321,510 B1 | 11/2012 | Queru | |
| 8,505,069 B1 | 8/2013 | Solodovnikov | |
| 8,527,977 B1 | 9/2013 | Cheng et al. | |
| 8,943,197 B1 | 1/2015 | Taylor | |
| 9,003,387 B2* | 4/2015 | Van Camp | G06F 8/65 717/170 |
| 9,031,382 B1 | 5/2015 | Kaiser | |
| 9,032,386 B1* | 5/2015 | Vaynshteyn | G06F 8/65 717/168 |
| 9,081,641 B2 | 7/2015 | Nakagawa et al. | |
| 9,201,643 B2 | 12/2015 | Nakamura | |
| 9,442,711 B2 | 9/2016 | Koyama | |
| 2001/0001272 A1 | 5/2001 | Ohira | |
| 2002/0166001 A1 | 11/2002 | Cheng et al. | |
| 2003/0046675 A1 | 3/2003 | Cheng et al. | |
| 2003/0046676 A1 | 3/2003 | Cheng et al. | |
| 2003/0110241 A1 | 6/2003 | Cheng, Jr. et al. | |
| 2003/0200541 A1 | 10/2003 | Cheng et al. | |
| 2004/0073902 A1 | 4/2004 | Kao | |
| 2004/0187103 A1 | 9/2004 | Wickham et al. | |
| 2004/0210941 A1* | 10/2004 | Poli | G06F 8/60 713/2 |
| 2004/0215755 A1 | 10/2004 | O'Neill et al. | |
| 2005/0015466 A1 | 1/2005 | Tripp | |
| 2005/0132348 A1 | 6/2005 | Meulemans et al. | |
| 2005/0228798 A1* | 10/2005 | Shepard | G06F 8/65 707/999.1 |
| 2005/0273779 A1 | 12/2005 | Cheng et al. | |
| 2006/0095533 A1 | 5/2006 | Toshimitsu et al. | |
| 2006/0168574 A1 | 7/2006 | Giannini et al. | |
| 2006/0282834 A1 | 12/2006 | Cheng et al. | |
| 2007/0150948 A1 | 6/2007 | De Spiegeleer | |
| 2007/0240147 A1* | 10/2007 | Bernabeu-Auban | G06F 8/65 717/174 |
| 2007/0294385 A1 | 12/2007 | Kapadekar | |
| 2007/0299870 A1 | 12/2007 | Finch | |
| 2008/0040712 A1 | 2/2008 | Tanaka | |
| 2008/0201702 A1* | 8/2008 | Bunn | G06F 8/67 717/171 |
| 2009/0133012 A1 | 5/2009 | Shih | |
| 2009/0252325 A1 | 10/2009 | Reus | |
| 2009/0276769 A1* | 11/2009 | Brannen, Jr. | G06F 8/61 717/174 |
| 2010/0011060 A1 | 1/2010 | Hilterbrand et al. | |
| 2010/0023934 A1* | 1/2010 | Sheehan | G06F 9/44536 717/168 |
| 2010/0095293 A1 | 4/2010 | O'Neill et al. | |
| 2010/0146334 A1 | 6/2010 | Jacobsen | |
| 2010/0169876 A1 | 7/2010 | Mann | |
| 2010/0306356 A1 | 12/2010 | Gao | |
| 2011/0238789 A1 | 9/2011 | Luby | |
| 2011/0265077 A1 | 10/2011 | Collison | |
| 2012/0036439 A1 | 2/2012 | Hsiao | |
| 2012/0060152 A1 | 3/2012 | Oh et al. | |
| 2012/0062944 A1 | 3/2012 | Nakamoto | |
| 2012/0072895 A1 | 3/2012 | Koyama et al. | |
| 2012/0079537 A1 | 3/2012 | Kalidindi | |
| 2012/0081506 A1 | 4/2012 | Marvit | |
| 2012/0144382 A1 | 6/2012 | Matthew | |
| 2012/0166592 A1 | 6/2012 | Elliot | |
| 2012/0179678 A1 | 7/2012 | Irie | |
| 2012/0240236 A1 | 9/2012 | Wyatt | |
| 2012/0257248 A1 | 10/2012 | Sato | |
| 2013/0159991 A1 | 6/2013 | Sato | |
| 2013/0339941 A1 | 12/2013 | Shelton | |
| 2014/0109079 A1 | 4/2014 | Cheng et al. | |
| 2014/0189675 A1 | 7/2014 | Cheng et al. | |
| 2014/0223423 A1* | 8/2014 | Alsina | G06F 8/65 717/173 |
| 2014/0282485 A1* | 9/2014 | Nakamura | G06F 8/65 717/173 |
| 2014/0282487 A1 | 9/2014 | O'Neill et al. | |
| 2014/0380299 A1 | 12/2014 | Nakamura | |
| 2017/0171360 A1 | 6/2017 | Phillips | |

FOREIGN PATENT DOCUMENTS

| | | |
|---|---|---|
| JP | H9-305383 | 11/1997 |
| JP | 10-320287 | 12/1998 |
| JP | 2000-083101 | 3/2000 |
| JP | 2000-137623 | 5/2000 |
| JP | 2000-338837 | 12/2000 |
| JP | 2001-051852 | 2/2001 |
| JP | 2001-075786 | 3/2001 |
| JP | 2002-278785 | 9/2002 |
| JP | 2002-319871 | 10/2002 |
| JP | 2003-67284 A | 3/2003 |
| JP | 2003-520364 | 7/2003 |
| JP | 2003-233504 A | 8/2003 |
| JP | 2004-355428 | 12/2004 |
| JP | 2005-135147 | 5/2005 |
| JP | 2006-165766 | 6/2006 |
| JP | 2006-243905 | 9/2006 |
| JP | 2007-164605 | 6/2007 |
| JP | 2008-134992 | 6/2008 |
| JP | 2010-086072 A | 4/2010 |
| JP | 2010-198630 | 9/2010 |
| JP | 2011-193264 | 9/2011 |
| JP | 2012-003329 | 1/2012 |
| JP | 2012-056199 | 3/2012 |
| JP | 2012-084118 | 4/2012 |
| JP | 2012-221268 | 11/2012 |
| JP | 2013-20481 A | 1/2013 |
| JP | 2013-020506 | 1/2013 |
| JP | 2013-137597 | 7/2013 |
| JP | 2014-179050 A | 9/2014 |
| JP | 2015-005061 | 1/2015 |

OTHER PUBLICATIONS

Bernedo, Alvaro. "How to Upgrade to iOS 7 From Older iOS Versions or From iOS 7 Beta." Guiding Tech, Sep. 22, 2013, web.archive.org/web/20130922010754/http://www.guidingtech.com/24459/how-to-upgrade-to-ios-7. Accessed Dec. 6, 2016.*

Harder, Bobbie. "Managing the WSUS Automatic Updates Client Download, Install, and Reboot Behavior with Group Policy." Technet, Microsoft, May 4, 2006, <technet.microsoft.com/en-us/library/cc512630(d=printer).aspx.> Accessed Aug. 17, 2017.*

U.S. Appl. No. 14/525,338, filed Oct. 28, 2014, Nakamura
U.S. Appl. No. 14/535,649, filed Nov. 7, 2014, Nakamura, et al.
U.S. Appl. No. 14/525,338, filed Oct. 28, 2014.
U.S. Appl. No. 14/535,649, filed Nov. 7, 2014.
Extended European Search Report dated Mar. 24, 2015 in Patent Application No. 14192670.9.
Extended European Search Report dated Apr. 1, 2015 in Patent Application No. 14191635.3.
Extended European Search Report dated Apr. 7, 2015 in Patent Application No. 14192000.9.
Office Action dated Apr. 15, 2016 in U.S. Appl. No. 14/525,338.
Extended European Search Report dated Oct. 31, 2016 in Patent Application No. 14860081.0.
Singaporean Office Action dated Oct. 31, 2016 in Patent Application No. 11201603071P.
Office Action dated Oct. 4, 2016, in Japanese Patent Application No. 2015-546568.
Office Action dated Oct. 3, 2016, in co-pending U.S. Appl. No. 14/535,649.
Office Action dated Jan. 26, 2017, in co-pending U.S. Appl. No. 14/525,338.
Office Action dated Jan. 17, 2017, in co-pending U.S. Appl. No. 14/535,649.

(56) References Cited

OTHER PUBLICATIONS

Office Action dated Jul. 19, 2017, in co-pending U.S. Appl. No. 15/131,310.
Office Action dated Jun. 19, 2017, in co-pending U.S. Appl. No. 14/535,649.
Office Action dated May 30, 2017, in co-pending U.S. Appl. No. 14/525,338.
Office Action dated Dec. 28, 2017, in co-pending U.S. Appl. No. 14/535,649.
International Search Report dated Nov. 11, 2014 in PCT/JP2014/076967 filed Oct. 8, 2014.
Written Opinion dated Nov. 11, 2014 in PCT/JP2014/076967 filed Oct. 8, 2014.
Office Action dated Jan. 25, 2018, in co-pending U.S. Appl. No. 15/131,310.

* cited by examiner

FIG. 6

```
{
  "version": "1.01",
  "dependency": "1.0.0",
  "description": "It is a sample data.",
  "files": [
    {
      "url": "https://update.example.jp/1.0.2/1.dat",
      "digest": "e049641fb440de..."
    },
    {
      "url": "https://update.example.jp/1.0.2/2.dat",
      "digest": "74672bfc48d123..."
    },
    {
      "url": "https://update.example.jp/1.0.2/3.dat",
      "digest": "ed048f0ff281d88..."
    },
  ],
  "scriptname": "update.dup",
  "require_reboot": true,
  "force_update": true,
  "isValid": false // executable/non-executable flag
}
```

METHOD FOR UPDATING A PROGRAM ON A COMMUNICATION APPARATUS

BACKGROUND OF THE INVENTION

1. Field of the Invention

The disclosures discussed herein relate to a communication apparatus, a communication system, a communication method, and a non-transitory recording medium storing a communication program.

2. Description of the Related Art

In the communication systems such as a teleconferencing system, firmware (programs) may be updated on a regular basis to improve confidentiality of phone communications and operational performances. There is disclosed in the related art communication systems a technique to update the programs by accessing a server to acquire update data and meta-information via a network (e.g., Patent Document 1). In such related art communication systems, the update data may generally be downloaded after the date at which the programs are allowed to start being updated.

Further, there is disclosed a technique to prevent saturated communications of traffic lines due to concentrated accesses resulting from a large number of download requests. In this technique, a client apparatus is provided with an inactivated content file before a predetermined set time, and is subsequently provided with information necessary for activating the content file to function after the predetermined set time (e.g., Patent Document 2).

However, in the related art systems configured to allow execution of contents, actual time information is used to determine whether an update is applicable. Accordingly, in the related art systems, executable time information predetermined by a server is downloaded by a client together with content data. Hence, a content providing side that wishes to change the executable time after the client terminal has already downloaded the contents is unable to change that executable time. For example, communications may fail when the version of the server mismatches the version of the client terminal.

RELATED ART DOCUMENTS

Patent Documents

Patent Document 1: Japanese Laid-open Patent Publication No. 2012-84118
Patent Document 2: Japanese Laid-open Patent Publication No. 2011-193264

SUMMARY OF THE INVENTION

Accordingly, it is a general object in one embodiment of the present invention to provide a communication apparatus, a communication system, a communication method, and a non-transitory recording medium having a program capable of executing an update at time where a terminal side is allowed to execute the update that substantially obviates one or more problems caused by the limitations and disadvantages of the related art.

In one aspect of the embodiment, there is provided a communication apparatus that includes a receiver configured to receive metadata, the metadata including information associated with update data capable of being executed after the receiver has received the metadata; and a determination part configured to determine whether an update of the update data is executable in accordance with the metadata. In the communication apparatus, when the determination part has determined that the update is executable, the update is executed.

Other objects, features and advantages of the present invention will become more apparent from the following detailed description when read in conjunction with the accompanying drawings.

BRIEF DESCRIPTION OF THE DRAWINGS

FIG. 6 is a schematic diagram illustrating an example of metadata;

DETAILED DESCRIPTION OF THE PREFERRED EMBODIMENTS

Figure 1:
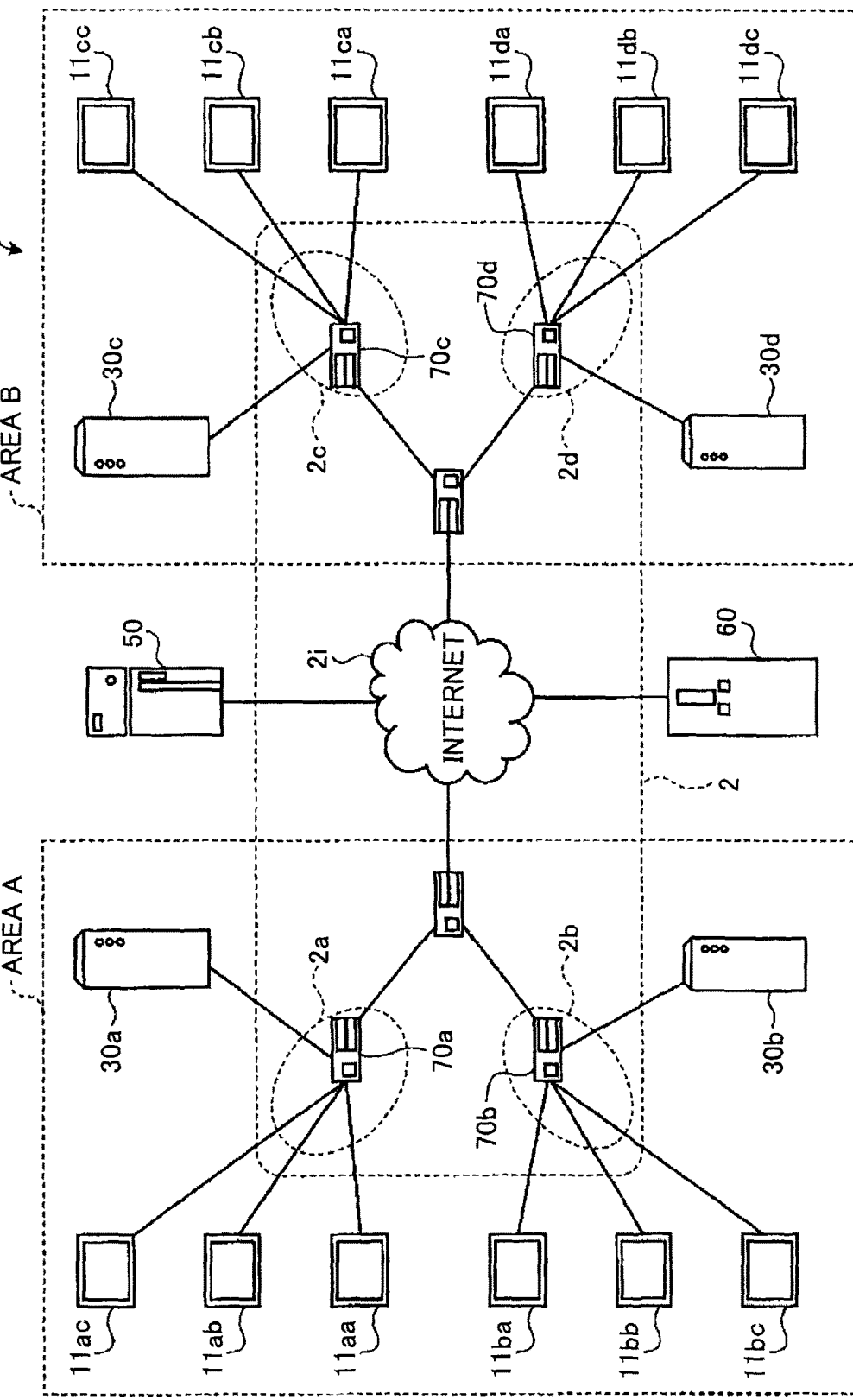
FIG. 1 is a schematic diagram illustrating a configuration example of a communication system according to an embodiment.

FIG. 1 is a schematic diagram illustrating a configuration example of a communication system according to an embodiment. The communication system 1 includes phone terminals 11aa to 11ac, 11ba to 11bc, 11ca to 11cc, and 11da to 11dc; relay apparatuses 30a to 30d, a communication management server 50, an update server 60, and routers 70a to 70d, which are connected via a network 2. Specifically, the communication system 1 is configured to include LANs 2a, 2b, 2c, and 2d connected to the Internet 2i via the routers 70a to 70d, the communication management server 50 and the update server 60 connected to the Internet 2i, the phone terminals 11aa to 11ac and the relay apparatus 30a connected to the LAN 2a, the phone terminals 11ba to 11bc and the relay apparatus 30b connected to the LAN 2b, the phone terminals 11ca to 11cc and the relay apparatus 30c connected to the LAN 2c, and the phone terminals 11da to 11dc and the relay apparatus 30d connected to the LAN 2d. In the communication system 1, the phone terminals 11aa to 11ac and 11ba to 11bc in an area A communicate with the phone terminals 11*ca* to 11*cc* and 11*da* to 11*dc* in an area B by mutually transmitting and receiving data including at least one of sound and video (images) via the relay apparatuses 30*a*, 30*b*, 30*c*, and 30*d*, under the management of the communication management server 50.

Specifically, the communication management server 50 is configured to manage communication addresses of the phone terminals 11*aa* to 11*ac*, 11*ba* to 11*bc*, 11*ca* to 11*cc*, and 11*da* to 11*dc*, and communication addresses of the relay apparatuses 30*a*, 30*b*, 30*c*, and 30*d*, the phone terminals to which the relay apparatuses 30*a*, 30*b*, 30*c*, and 30*d* relay data, and calling statuses of the phone terminals. For example, in a case where the phone terminal 11*aa* makes a phone call to the phone terminal 11*ca*, the phone terminal 11*aa* requests the relay apparatus 30*a* to relay the phone call to the phone terminal 11*ca*. The relay apparatus 30*a* reports (sends) the phone call started by the phone terminal 11*aa* to the communication management server 50, and acquires a communication address of the relay apparatus 30*c* for relaying the phone call to the phone terminal 11*ca*. Subsequently, the relay apparatus 30*a* requests the relay apparatus 30*c* to relay the phone call to the phone terminal 11*ca*, and the relay apparatus 30*c* starts a communication session with the phone terminal 11*ca*. Subsequently, the relay apparatus 30*c* reports the start of the communication session with the phone terminal 11*ca* to the communication management server 50.

Hence, the communication between the phone terminal 11*aa* and the phone terminal 11*ca* has started via the relay apparatuses 30*a* and 30*c*. Further, the communication management server 50 is configured to manage a telephone call status such as an engaged status of the telephone call between the phone terminals 11*aa* and 11*ca*. For example, when the communication management server 50 receives an inquiry about the telephone call status of the phone terminal 11*aa* or 11*ca* from the phone terminal 11*ab*, the communication management server 50 transmits a reply indicating that the phone terminal 11*aa* or 11*ca* is online but the phone terminals 11*aa* and 11*ca* are mutually engaged in receiving their telephone calls.

In the following description, any of apparatuses of the same type are provided with the same reference numbers; however, alphabetical subscript characters subsequent to the reference numbers are omitted. For example, the phone terminals 11*aa* to 11*ac*, 11*ba* to 11*bc*, 11*ca* to 11*cc*, and 11*da* to 11*dc* are abbreviated as the phone terminal 11. Likewise, the relay apparatuses 30*a* to 30*d* are abbreviated as the relay apparatus 30.

The update server 60 is configured to manage information associated with updates of programs of the phone terminal 11 and various types of setting information of the phone terminal 11, and provide such information in response to a request from the phone terminal 11. Examples of the information associated with updates include data files of all versions from the earlier versions to the latest versions of the programs of the phone terminal 11 and various types of setting information of the phone terminal 11, and metadata (meta-information) describing update contents for each of the versions. The update server 60 manages all the versions of the data files as the information associated with updates because each of the phone terminals updates its information and the like at a different time.

Specifically, the phone terminals frequently updating the information or the like may need updating of only the latest version of the information. However, those rarely updating information or the like may need to go far back to the earlier versions on which the latest version has dependency to update all the earlier versions on which the latest version has dependency in addition to updating the latest version. Hence, since there are phone terminals that need to update not only the latest version but also the versions on which the latest version has dependency, the update server 60 manages all the versions of the information or the like as the information associated with updates. In the present embodiment, the update server 60 is configured to manage both update data and metadata of the update data. However, the update data and the metadata of the update data may be managed by separate servers.

There are two types of updates, namely, a normal update and a forced update. The normal update is aimed at eliminating an error such as a bug from the phone terminal or adding a function to the phone terminal. On the other hand, the forced update is aimed at updating the information necessary according to a change in functions of other apparatuses or functions of the phone terminal itself. For example, there is a case where data formats or video codecs for transmitting or receiving sound and images are changed, and a version of the relay apparatus 30 associated with a video such as an encoder update may be updated due to such changes. Further, a communication protocol with the relay apparatus 30 may be changed. The above changes may change structures of the sound, images, and videos themselves, or the change in the communication protocol may change a communication procedure itself with the relay apparatus 30, or functions of the relay apparatus 30. Hence, the phone terminal 11 before being updated is not able to perform a primary function of calling. In such a case, a forced update may be run on the phone terminal 11 to be adapted to the updated version of the relay apparatus 30.

Further, in a case where there is a security problem such as a security hole found in the relay apparatus 30, an update for eliminating a vulnerability due to the security hole may be run on the relay apparatus 30. In the above case, the phone terminal 11 before being updated is not able to perform calling. Hence, a forced update may be run on the phone terminal 11 so as to be adapted to countermeasures against the vulnerability due to the security hole in the relay apparatus 30.

Figure 2:
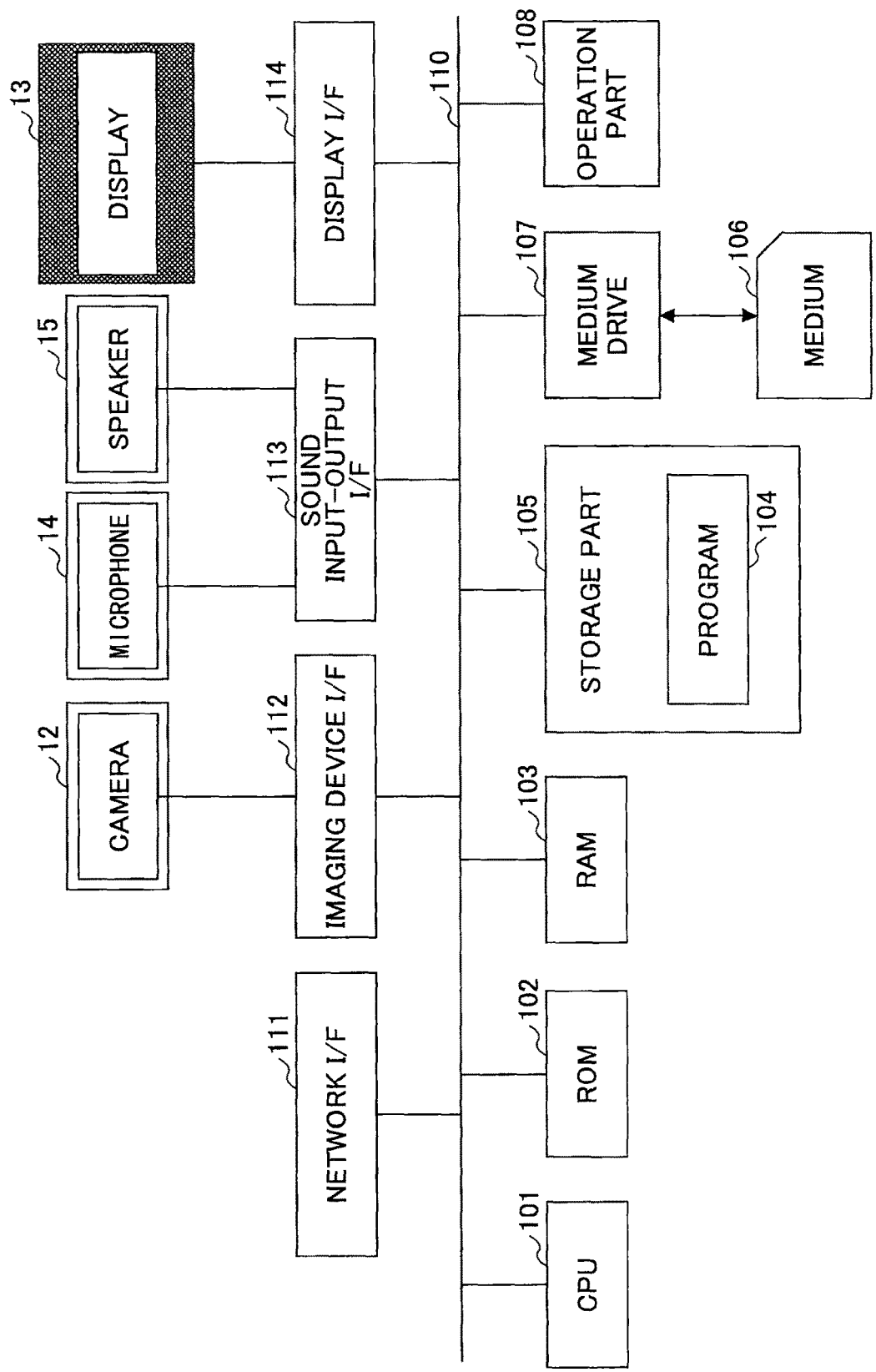
FIG. 2 is a block diagram illustrating a hardware configuration example of a phone terminal.

Next, a description is given of a hardware configuration of the phone terminal 11. FIG. 2 is a block diagram illustrating the hardware configuration of the phone terminal 11. As illustrated in FIG. 2, the phone terminal 11 is configured to include a central processing unit (CPU) 101, a read only memory (ROM) 102, a random access memory (RAM) 103, a storage part 105, a medium drive 107, an operation part 108, a network I/F ill, an imaging device I/F 112, a sound input-output I/F 113, and a display I/F 114, which are connected to one another via a bus 110.

The CPU 101 is configured to centrally control operations of the phone terminal 11 by loading programs 104 stored in the ROM 102 or the storage part 105 in the RAM 103, and sequentially executing the loaded programs. The storage part 105 may be a hard disk drive (HDD), and a solid state drive (SDD), and is configured to store data to be readable/writable. Specifically, the storage part 105 stores the programs 104 to be executed by the CPU 101, or various types of setting information. When the phone terminal 11 is updated, the programs 104 or various types of setting information stored in the storage part 105 are updated.

The medium drive 107 is a drive device configured to read data from or write into a medium 106 such as an optical disk. The operation part 108 includes a keyboard, various types of keys, a touch panel stacked on a display 13, and the like, and is configured to receive user's operational inputs. The network I/F 111 is an interface connected to the communication network 2 and configured to perform data communications via the communication network 2. The imaging device I/F 112 is an interface connected to a camera (digital still camera) 12 and configured to acquire an image imaged by the camera 12. The sound input-output I/F 113 is an interface connected to a microphone 14 and a speaker 15 and configured to input sound via the microphone 14 and output sound via the speaker 15. The display I/F 114 is an interface connected to the display 13 such as a liquid crystal display (LCD) and the like.

Note that the present embodiment includes the display 13; however, the present embodiment may include a display apparatus other than the display 13 such as a projector or the like.

When the phone terminal 11 is engaged in receiving a phone call from another phone terminal, the phone terminal 11 outputs the images acquired from the camera 12 or sound input via the microphone 14 to the relay apparatus 30 via the network I/F 111. Further, the phone terminal 11 outputs from the speaker sound input from the other phone terminal via the network I/F 111 and similarly displays on the display 13 the images acquired from the other phone terminal. Accordingly, the phone terminal 11 may be able to make a phone call with the other phone terminal by exchanging the images or sound. That is, the phone terminal 11 may be able to implement a so-called teleconference with the other phone terminal. Note that the phone terminal 11 may be any communication terminal such as a general-purpose personal computer (PC), a smartphone, a mobile phone, and a tablet terminal.

Figure 3:
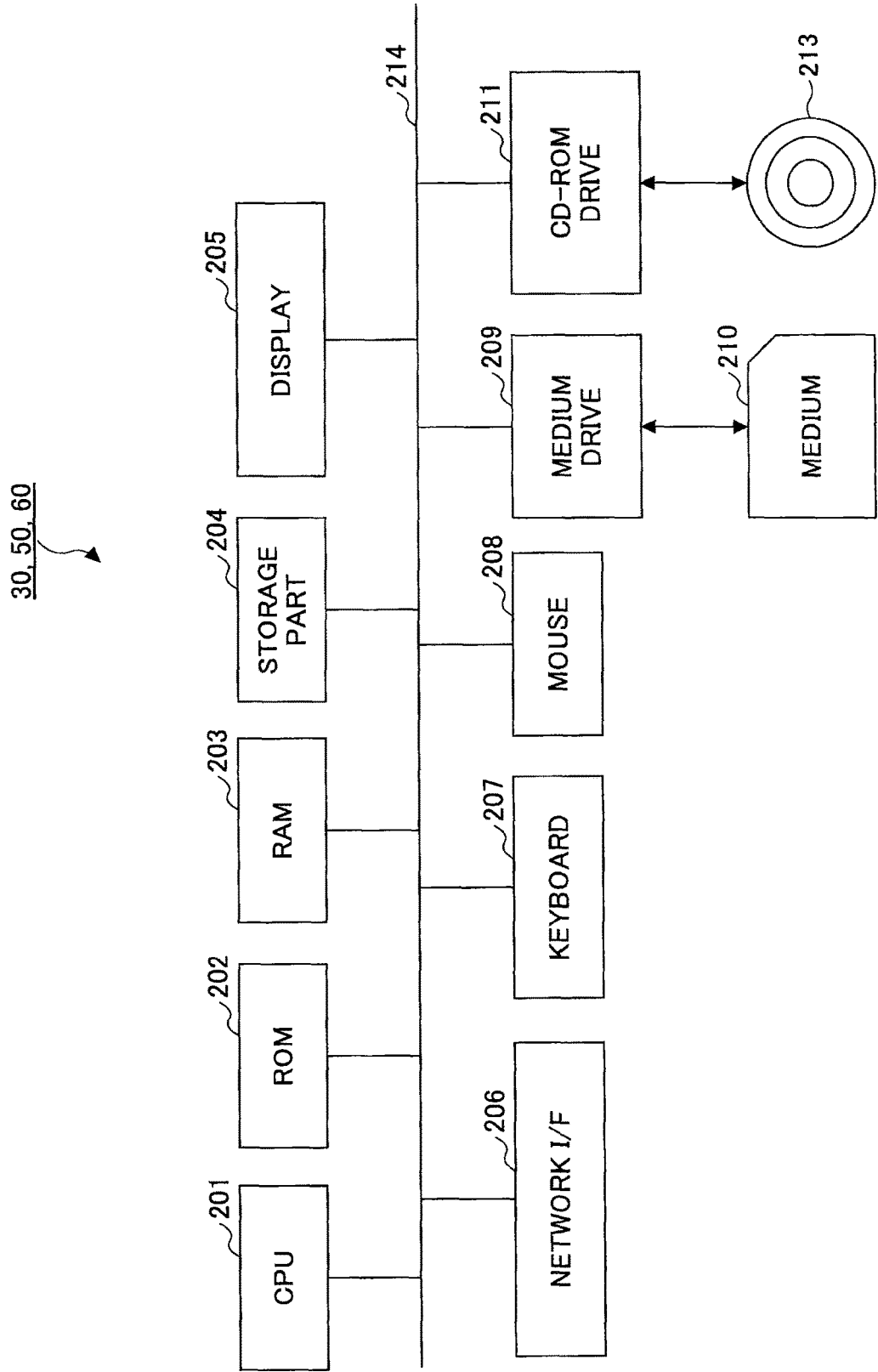
FIG. 3 is a block diagram illustrating a hardware configuration example of a relay apparatus, a communication management server, and an update server.

Next, an illustration is given of respective hardware configurations of the relay apparatus 30, the communication management server 50, and the update server 60. FIG. 3 is a block diagram illustrating a hardware configuration example of a relay apparatus, a communication management server, and an update server. As illustrated in FIG. 3, each of the relay apparatus 30, the communication management server 50, and the update server 60 includes a CPU 201, a ROM 202, a RAM 203, a storage part 204, a display 205, a network I/F 206, a keyboard 207, a mouse 208, a medium drive 209, and a CD-ROM drive 211, which are connected to one another via a bus 214. Each of the relay apparatus 30, the communication management server 50, and the update server 60 may be an apparatus such as a so-called personal computer (PC) or a workstation (WS).

The CPU 201 is configured to centrally control operations of the own phone terminal 11 by loading programs stored in the ROM 202 or the storage part 204 in the RAM 203, and sequentially executing the loaded programs. The storage part 204 may be an HDD or an SSD, and is configured to store data to be readable or writable. For example, in the update server 60, the storage part 204 stores information associated with updates.

The display 205 may be an LCD. The network I/F 206 is an interface connected to the communication network 2 and configured to perform data communications via the communication network 2. The keyboard 207 and the mouse 208 are configured to receive user's operational inputs. The medium drive 209 is a drive device configured to read data from or write into a medium 210 such as an optical disk. The CD-ROM drive 211 is a drive device configured to read the CD-ROM 213. For example, in the update server 60, the latest information associated with updates is provided by the medium 210 or the CD-ROM 213, and the provided latest information is stored in the storage part 204.

Figure 4:
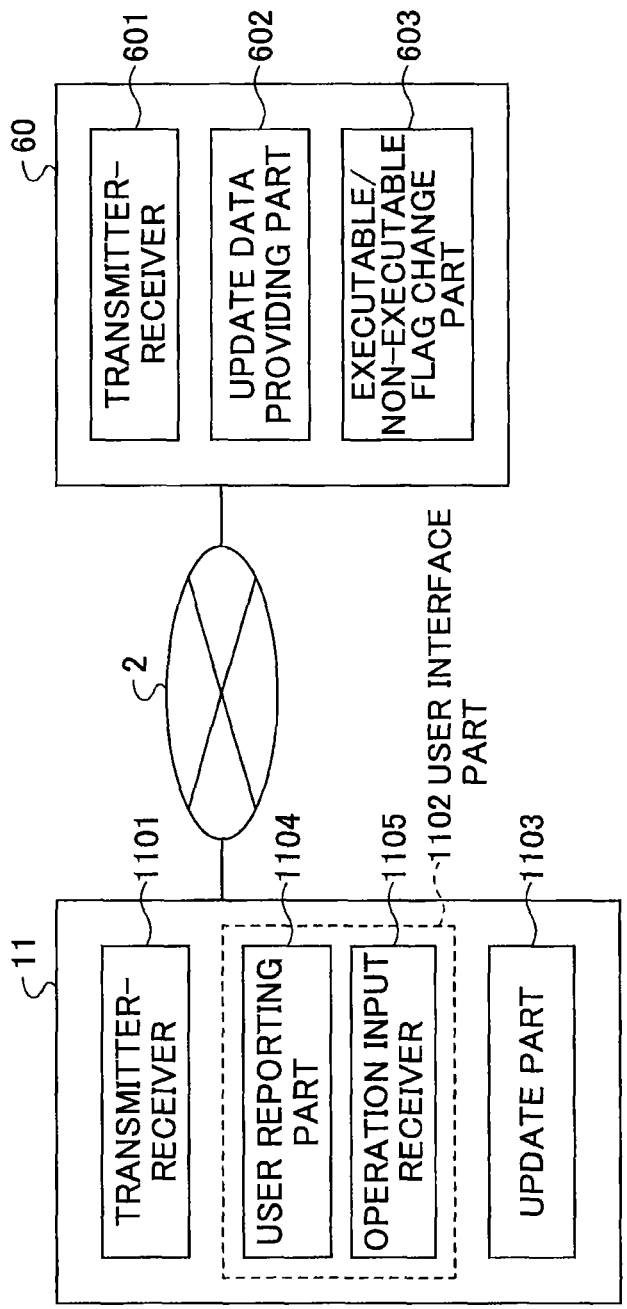
FIG. 4 is a block diagram illustrating a functional configuration example of the phone terminal and the update server according to an embodiment.

Next, an illustration is given of a functional configuration of the phone terminal 11 and the update server 60, which may be implemented by causing the CPU 101 or CPU 201 to execute programs. FIG. 4 is a block diagram illustrating a functional configuration example of the phone terminal and the update server of the embodiment. As illustrated in FIG. 4, the phone terminal 11 mainly includes a transmitter-receiver 1101, a user interface part 1102, and an update part 1103. The update server 60 mainly includes a transmitter-receiver 601, an update data providing part 602, and an executable/non-executable flag change part 603. Note that part of or all of the functions of the phone terminal 11 and the update server 60 may be formed of hardware.

The transmitter-receiver 1101 is a functional part configured to transmit data to or receive data from the update server 60 via the communication network 2. Specifically, the transmitter-receiver 1101 transmits data to or receives data from the update server 60 by establishing predetermined communication sessions between the phone terminal 11 and the update server 60, using a communication address of the update server 60 stored in advance in the storage part 105, or using a communication address of the update server 60 acquired by querying the communication server 50. The data that the transmitter-receiver 1101 transmits or receives are information (e.g., metadata or update data) associated with updates managed by the update server 60.

The user interface part 1102 includes a user reporting part 1104 configured to transmit various types of reports via the speaker 15 configured to output sound or a display screen of the display 13, and an operations input receiver 1105 configured to receive user's operational inputs via the operation part 108.

The update part 1103 is configured to control updating of the programs 104 or various types of setting information stored in the storage part 105 and execute the update based on associated information (metadata) associated with updates acquired from the update server 60. The updating executed by the update part 1103 will be described in detail in the later-described update process (step S19 of FIG. 5).

The transmitter-receiver 601 is configured to transmit data to or receive data from the phone terminal 11 via the communication network 2. Specifically, the transmitter-receiver 601 is configured to transmit data to or receive data from the phone terminal 11 by starting a communication session using a predetermined protocol in response to a request from the phone terminal 11 via the communication network 2. The present embodiment describes an example in which the update server 60 transmits information associated with the update in response to a request from the phone terminal 11. However, when metadata of the latest update data are newly stored or the stored metadata are changed, the update data providing part 602 may transmit the metadata to the phone terminal 11.

The update data providing part 602 is configured to provide the phone terminal 11 with information associated with updates managed by the update server 60 in response to a request from the phone terminal 11 to which the transmitter-receiver 601 transmits data or from which the transmitter-receiver 601 receives data.

The executable/non-executable flag change part 603 is configured to control a flag indicating whether to allow the phone terminal 11 to execute an update of downloadable update data. Specifically, the executable/non-executable flag change part 603 is configured to change a status where execution of the update is not allowed to a status where the execution of the update is allowed, or change the status where the execution of the update is allowed to the status where the execution of the update is not allowed. The flag may be changed by receiving an input from the keyboard 207 or the mouse 208. Further, a time for changing flag information may be set in advance to change the flag information at the predetermined set time.

Figure 5:
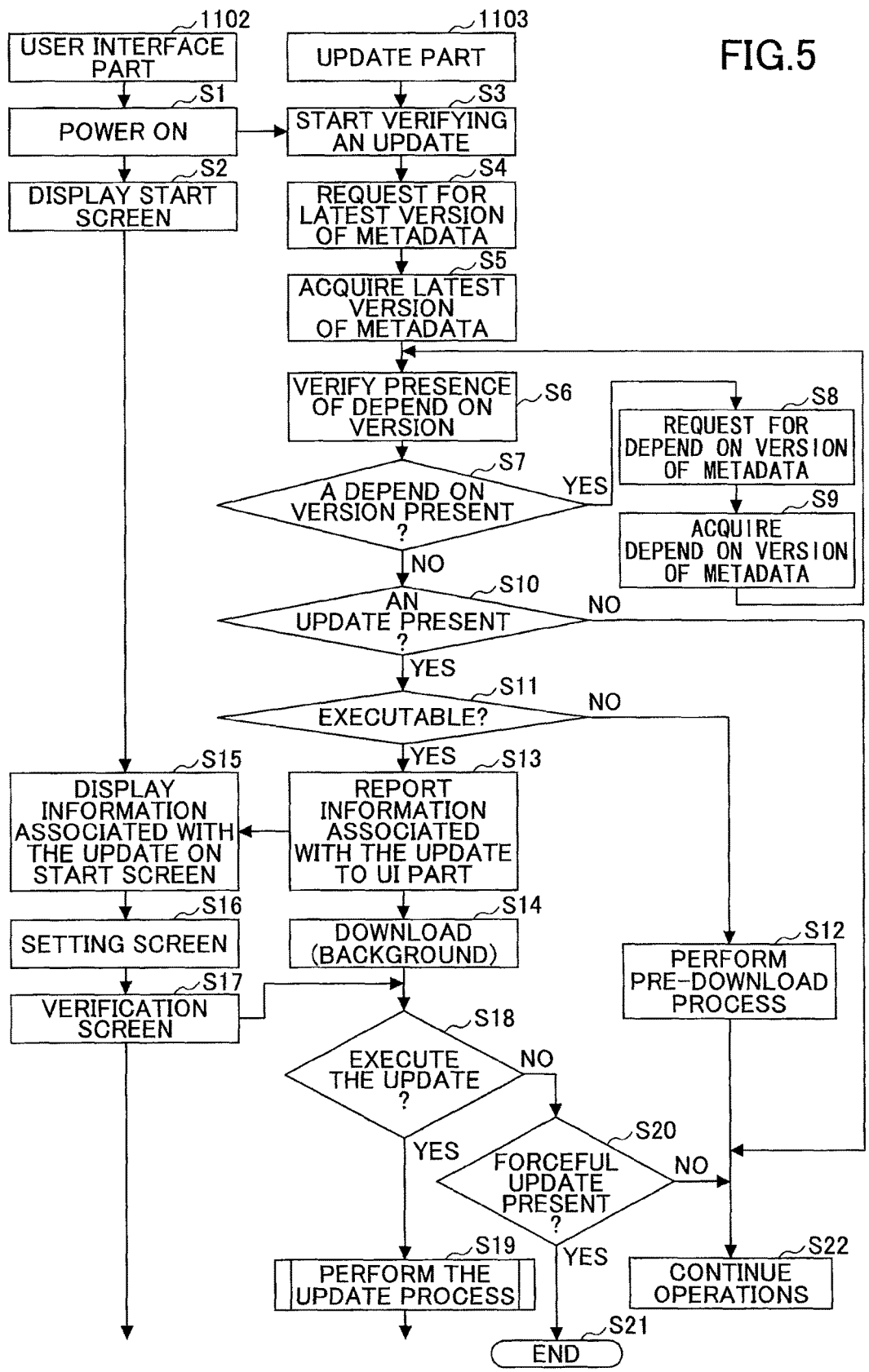
FIG. 5 is a flowchart illustrating an example of operations of the phone terminal according to an embodiment.

Subsequently, an illustration is given of an example of a process to be executed by the phone terminal 11. FIG. 5 is a flowchart illustrating an example of operations of the phone terminal of the embodiment.

As illustrated in FIG. 5, the user interface part 1102 supplies power to the phone terminal 11 (step S1) based on an operation on a power supply switch or the like of the operation part 108, and displays a start screen on the display 13 (step S2). The start screen is a display screen presenting a list of calling status of each of the phone terminals 11 obtained as a result of transmitting the inquires to the communication management server 50 under control of the CPU 101 (details will be described later).

The update part 1103 starts verifying an update of the own phone terminal at the start after power is supplied in step S1 (step S3). Note that the update of the phone apparatus includes updating the programs and updating various types of setting information.

When the update part 1103 starts verifying the update, the update part 1103 causes the transmitter-receiver 1101 to transmit a request to the update server 60 to provide the update part 1103 with metadata of the latest version of the programs (step S4), and the update part 1103 acquires the metadata provided by the update data providing part 602 in response to the request (step S5).

Here, an illustration of the metadata is given. The metadata includes metadata of the executable update data and metadata of update data that may be downloaded before the update executable date. FIG. 6 illustrates a schematic diagram illustrating an example of the metadata. The metadata in FIG. 6 includes "version", "dependency", "description", "files", "scriptname", "require_reboot", "force_update", and "isValid". The "version" indicates a version number such as "1.0.1". The "dependency" indicates another version number such as "1.0.0" that is depended on by the version number of the above "version". That is, versions having dependency on the version number of the "version" may be traced by checking the version number of the "dependency". The "description" indicates detailed information of the update data such as "Itissampledata.". The "files" include a list of programs (data files) that are update entities managed by the update server 60, and URL information indicating storing destinations of the data files. Hence, the update part 1103 may be able to cause the transmitter-receiver 1101 to acquire the data files based on contents described in the date items of the "files". The "scriptname" includes a script name to be executed when the update is executed. The "require_reboot" includes a flag ("true" or "false") indicating whether to reboot the apparatus after the update is executed. The "force_update" includes a flag ("true" or "false") indicating whether the update is a forced update. The "isValid" includes a flag ("true" or "false") indicating whether the update data are executable. The description of the "isValid" is not limited to "true" or "false", and may include other strings. For example, "true" may be described when the update is executable, whereas date and time for allowing the execution of the update such as "2013/10/20" may be described in the flag of the "isValid". The phone terminal 11 determines whether to execute an update in accordance with the flag described in the "isValid".

Some of the updates of the programs 104 are associated with device control such as the network I/F 111, the imaging device I/F 112, the sound output I/F 113, the display I/F 114, and the like. The "true" is described in the "require_reboot" since such device control updates may require rebooting after updating. Further, updating the programs 104 includes normal updating and forced updating, and the "true" is described in the "force_update" when updating the programs 104 is to be forced.

Subsequently, the update part 1103 verifies whether there are depended-on versions based on the contents described in a data item of the "dependency" of the acquired metadata (step S6). For example, when the data item of the "dependency" describes a version number indicating a different number such as "1.0.0" as illustrated in FIG. 6, the update part 1103 verifies that there is a depended-on version. Further, when there is no statement described in the data item of the "dependency", the update part 1103 verifies that there is no depended-on version.

Subsequently, the update part 1103 determines whether there is a depended-on version as a result of the verification in step S6 (step S7). When there is a depended-on version (YES in step S7), the update part 1103 causes the transmitter-receiver 1101 to transmit a request for acquiring metadata of the depended-on version of the program to the update server 60 (step S8). Then, the update part 1103 acquires the depended-on version of the metadata provided by the update data providing part 602 in response to the request (step S9), and proceeds with the process in step S6. Hence, the update part 1103 sequentially traces the depended-on versions with respect to the latest version and acquires the metadata associated with the traced depended-on version.

Subsequently, the update part 1103 verifies whether there are new update data newer than a program 104 stored in the storage part 105 by comparing a version number described in the "version" of the metadata acquired from the server and a version number of the program 104 stored in the storage part 105 (step S10). Specifically, when the version number of the program 104 matches the version number described in the "version" of the metadata acquired from the update server 60 to indicate that the program 104 is the latest version, the update part 1103 determines that there is no update that needs to be acquired. Further, when the version number indicated by the acquired metadata does not match the version number of the program 104 to indicate that there is a version newer than the version of the program 104, the update part 1103 determines that there is an update that needs to be acquired.

When the update part 1103 determines that there are no update data newer than the program 104 (NO in step S10), the update part 1103 allows the phone terminal 11 to continue to perform normal operations (step S22). When the update part 1103 determines that there are update data newer than the program 104 (YES in step S10), the update part 1103 determines whether the new update data are executable (step S11). Specifically, the update part 1103 determines whether the new update data are executable based on the flag information included in the "isValid" of the latest version of the metadata. For example, when the flag information of the "isValid" is "false", the update part 1103 determines that the latest update data are not executable. On the other hand, when the flag information of the "isValid" is "true", the update part 1103 determines that the latest update data are executable.

When the update part 1103 determines that the latest update data are not executable (NO in step S11), the update part 1103 executes a pre-download process (step S12). Specifically, although the update part 1103 is unable to execute the update at the present time, the update part 1103 downloads update data that are allowed to be downloaded in advance. After the update part 1103 executes the pre-download process, the update part 1103 allows the phone terminal 11 to continue to perform normal operations (step S22). Note that the pre-download process may be run in the background.

When the update part 1103 determines that the latest update data are executable (YES in step S11), the update part 1103 reports information associated with the update to the user interface part 1102 (step S13). Specifically, the update part 1103 reports data items other than those unnecessary for reporting to the user such as "files", "scriptname", and the like among the metadata having the latest version and depended-on versions depended on by the latest version to the user interface part 1102.

The user reporting part 1104 of the user interface part 1102 reports to the user an indication that there are update data necessary for the own phone terminal based on the information associated with the update (step S15). Note that the information associated with the update is reported by the update part 1103 in step S13 by displaying the indication on a start screen of the display 13.

After the information associated with the executable update is reported to the user interface part 1102 in step S13, the download of acquirable update data may be automatically started in step S14. The automatic download of the update data may be run in the background while information associated with the automatic download of the update data is presented to the user by displaying the information on a display screen such as a start screen. Further, the download run in the background may be interrupted at the time where the user starts communicating with another phone terminal despite the fact that the download has not completed. The download may be restarted after the user ends the communication with the other phone terminal. Note that whether to perform the automatic download in the background may be changed by the setting screen illustrated in FIG. 8.

Figure 7:
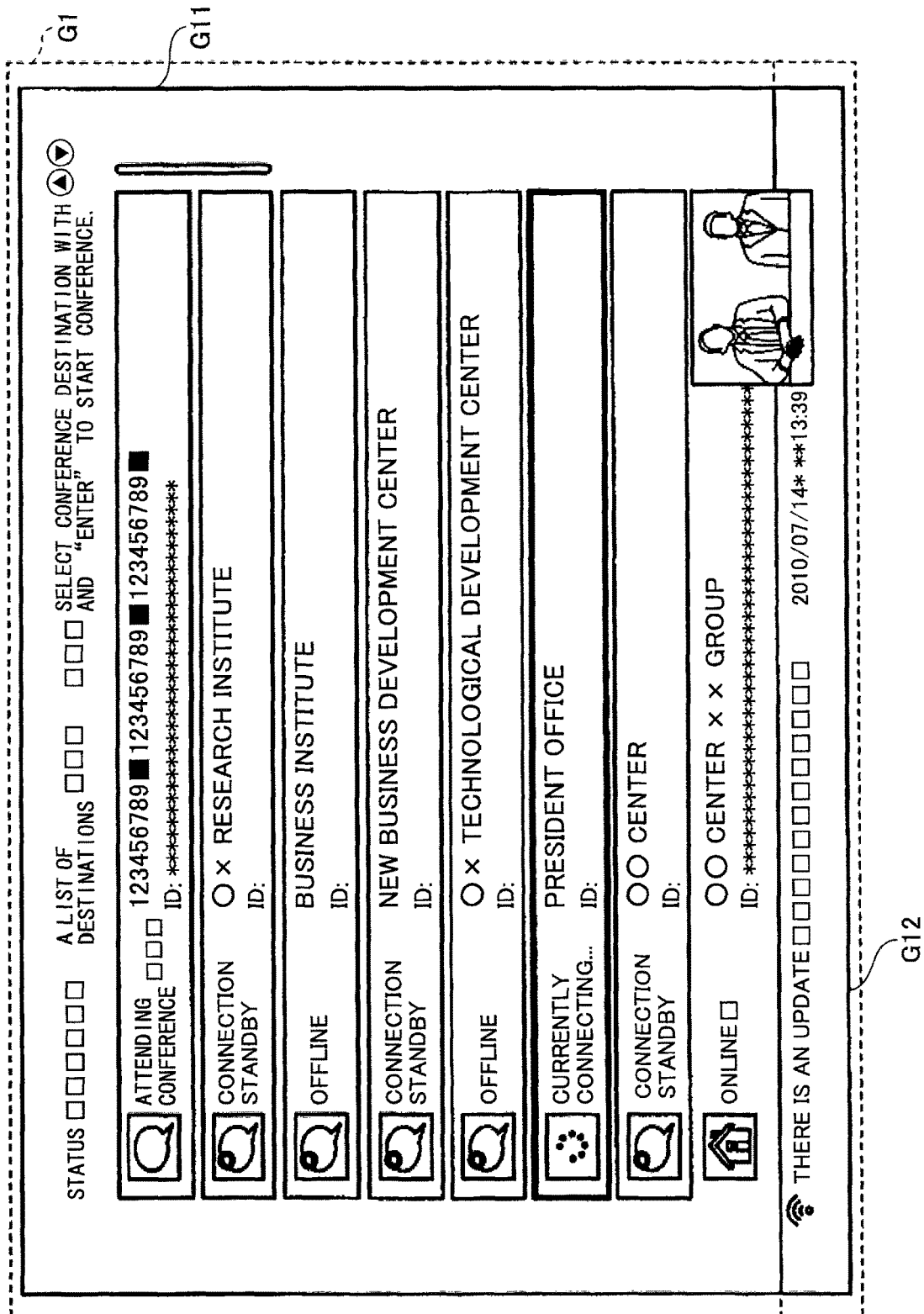
FIG. 7 is a schematic diagram illustrating a start screen.

In the following, illustration is given of the start screen. FIG. 7 is a schematic diagram illustrating an example of the start screen. As illustrated in FIG. 7, the start screen G1 is configured to include a main screen G11 displaying a list of calling statuses of the phone terminals, and a status screen G12 displaying a status of the own phone terminal. When information associated with the update is reported from the update part 1103, the user reporting part 1104 reports to the user an indication that there is an update by displaying the indication on the status screen G12. Note that the indication that there is an update is not limited to a layout illustrated in FIG. 8, and the indication may be displayed with a predetermined icon image on the main screen G11. Note that in the example of the start screen illustrated in FIG. 7, parts illustrated as outline squares or solidly filled squares represent areas that may display messages. Those parts may be predetermined message display areas on the system.

Further, when "true" is described in the "force_update" of the data item included as information associated with the update, the user reporting part 1104 reports to the user an indication that the update present in the own phone terminal is a forced update by displaying the indication on the start screen G1. Specifically, the user reporting part 1104 reports to the user the indication that the update present in the own phone terminal is a forced update by displaying the indication on the status screen G12, or by displaying the list with gray color or the like on the main screen G11 to indicate that operations other than update operations are disabled.

When the operations input receiver 1105 of the user interface 1102 receives an operational instruction to perform various types of settings such as updating as a result reporting the indication to the user in step S15, the user interface part 1102 causes a setting screen to appear on the display 13 (step S16).

Figure 8:
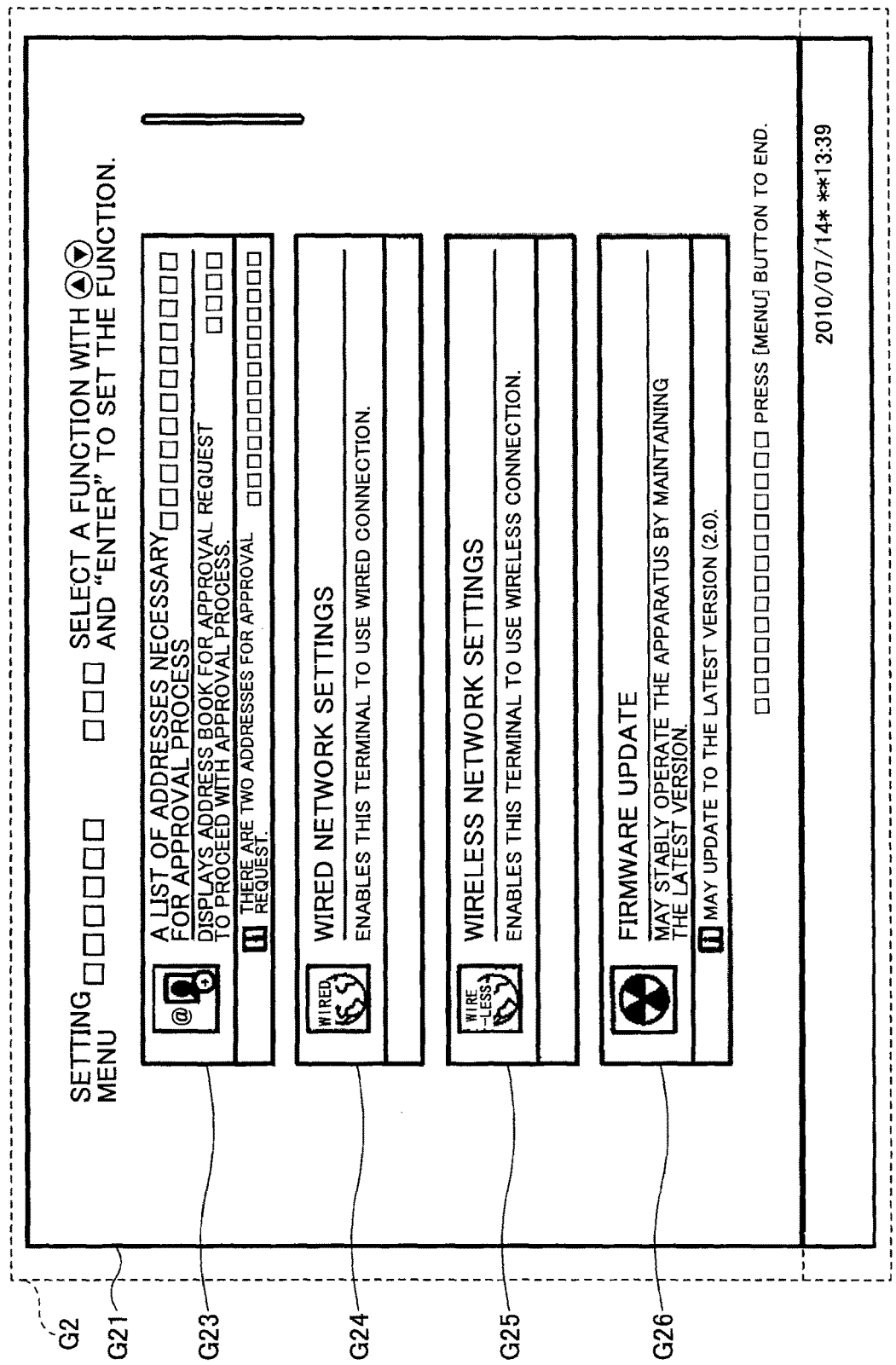
FIG. 8 is a schematic diagram illustrating a setting screen.

FIG. 8 is a schematic diagram illustrating an example of a setting screen G2. As illustrated in FIG. 8, the setting screen G2 is configured to include a main screen G21 displaying setting buttons G23 to G26 for setting various types of settings on receiving the user's selecting operation via the operations input receiver 1105. The setting button G26 of the setting buttons G23 to G26 is used for executing the update. When the information associated with the update is not reported from the update part 1103 to indicate that the update is not present in the own phone terminal 11, the setting button G26 is displayed with gray color to indicate that the user's selecting operation to select the setting button G26 is disabled. By contrast, when the information associated with the update is reported from the update part 1103 to indicate that the update is present in the own phone terminal 11, the gray out display (i.e., a gray out graphical control element) is cancelled to enable the operations input receiver 1105 to receive the user's selecting operation. In this case, the version number of the latest version subject to updating may be described in the setting button G26 based on the statement of the "version" of the data item included as information associated with the update. In this example, the version number is updated to the latest version 2.0. Note that the setting screen G2 may further be configured to include a status screen to display a status of the own phone terminal.

In step S16, when the user selects the setting button G26, the user interface part 1102 causes the display 13 to display a verification screen for the user to verify the execution of the update (step S17).

Figure 9:
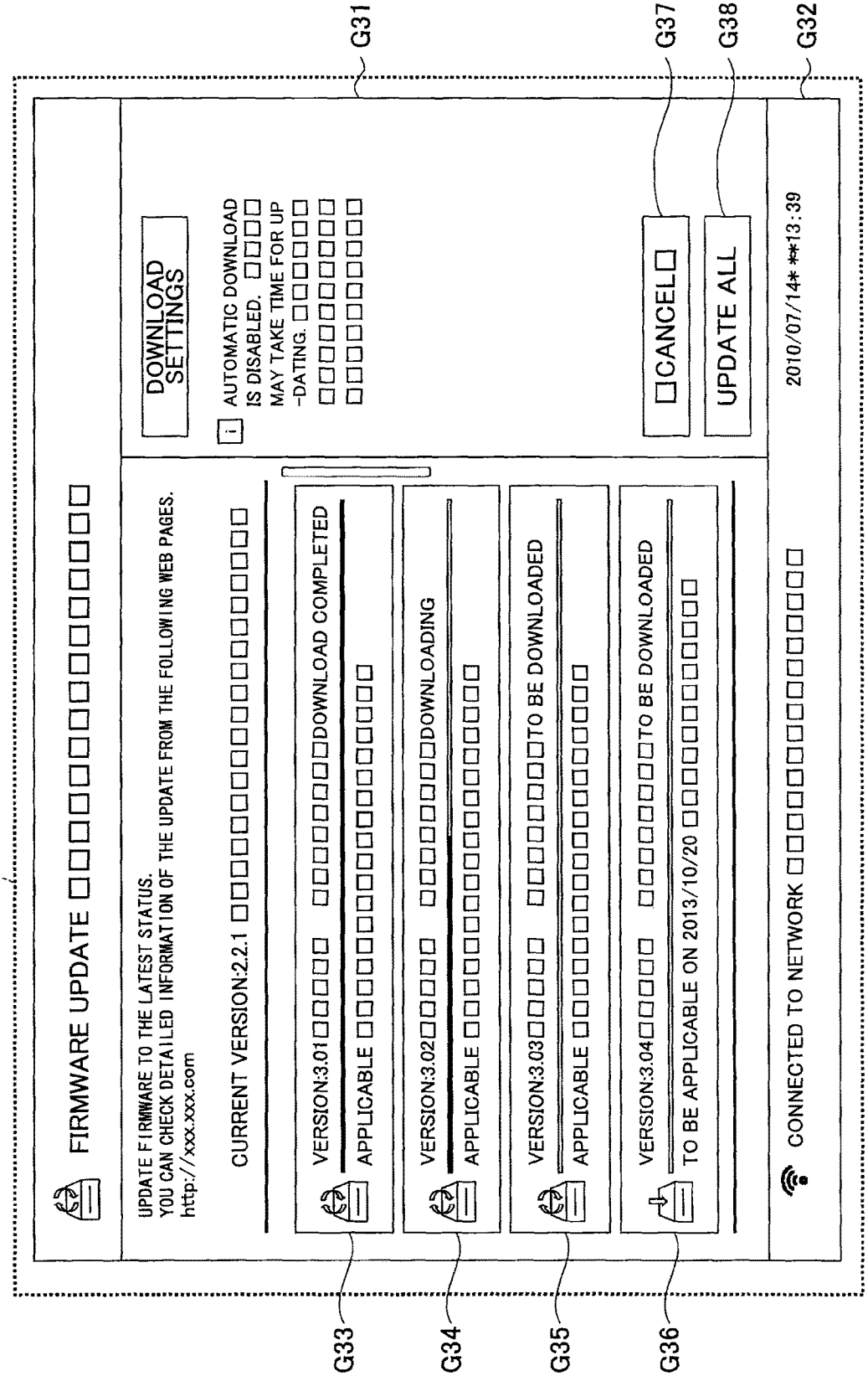
FIG. 9 is a schematic diagram illustrating an example of a verification screen according to an embodiment.

FIG. 9 is a schematic diagram illustrating an example of a verification screen according to an embodiment. An update verification screen G3 is configured to include a main screen G31 including update progress status screens G33 to G36 to display update progress statuses of respective version numbers, an operation button G37 to receive an instruction to cancel the update and an operation button G38 to receive an instruction to execute an upload, and a status screen G32 to display a status of the own phone terminal.

The update verification screen G3 is configured based on the metadata acquired from the update server 60; that is, the update verification screen G3 is configured based on information such as the number of versions to be updated, and whether the update is executable. In the example of FIG. 9, there are four updates to be applied to the phone terminal 11. More specifically, the versions "3.01", "3.02", and "3.03" being applicable at that time may be presented by displaying a string "applicable" as well as displaying an icon indicating that the update is executable. The version "3.04" is presented with a string "applicable on Oct/20/2013" and an icon representing the update data being only downloadable. Further, a download progress status at the time is displayed on a progress bar for each version. Note that the progress status is not limited to displaying on the progress status bar, and the progress status may be represented by string information such as numerals. The information to be displayed on the verification screen for each version is not limited to that illustrated in the example of the screen, and the information to be displayed on the verification screen for each version may be changed. In addition, as illustrated in FIG. 9, the information as to whether the update is executable may be presented with an icon, and hence whether the update is executable may be identified with the presented icon. For example, two types of icons may be prepared, one representing the download and the update both being executable, and the other representing only the download being executable. Note that the presentation of the above-described update information and information associated with the download progress status is not limited to the display on the screen illustrated in FIG. 9. The presentation of the above-described update information and information associated with the download progress status may presented by sound from the speaker 15.

Figure 10:
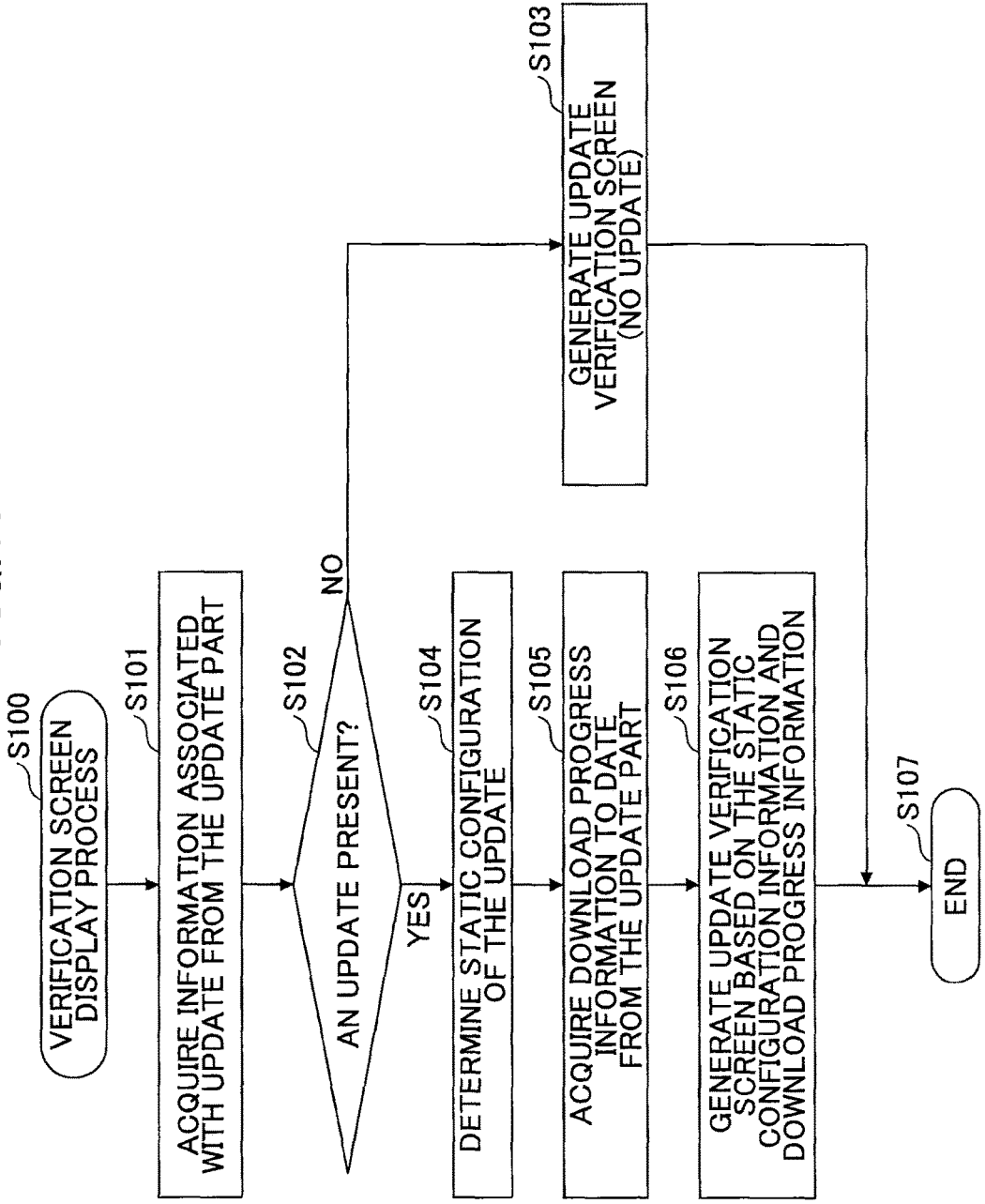
FIG. 10 is a flowchart illustrating an example of a display process of the verification screen.

Next, a description is given of a process executed by the phone terminal 11 for displaying the update verification screen of FIG. 9. FIG. 10 is a flowchart illustrating an example of a display process of the update verification screen. In step S13 of FIG. 5, a verification screen display process is started at a time where the update part 1103 reports information associated with the update to the user interface part 1102 (step S100 of FIG. 10).

The user reporting part 1104 acquires the information associated with the update included in the metadata from the update part 1103 (step S101). The user reporting part 1104 determines whether the update is executable at the present time based on the acquired information associated with the update, or whether the update data to be updated in the future are present in the update server 60 (step S102).

When the corresponding update data are not present in the server 60 (NO in step S102), the update verification screen indicating the program 104 being the latest version is generated, and the process then ends (steps S103 and S107). When the corresponding update data are present in the server 60 (YES in step S102), the user reporting part 1105 determines a configuration of the update verification screen in accordance with the information associated with the update (step S104). Specifically, the update verification screen is configured based on the number of corresponding update data files included in the information associated with the update, version information of each of the updates, and information associated with each update being executable. The information used for configuring the update verification screen is not limited to those information items described above, and the information used for configuring the update verification screen may be changed in any configuration. Further, the configuration of the update verification screen is not limited to strings, and the configuration of the update verification screen may be combinations of strings and icons. For example, the update verification screen may be configured as follows. The number of frames is determined based on the number of the update data files, and each update information item is displayed in a corresponding one of the frames. Each update information item is configured to include update version information in association with string information and/or icon information indicating whether the corresponding update is applicable or non-applicable, or the like.

Next, the download progress status of each update data file is acquired from the update part 1103 (step S105). Subsequently, the screen configuration determined in step S104 is associated with the download progress status acquired in step S105, the associated screen is reported to the user, and the process then ends (steps S106 and S107).

Figure 11:
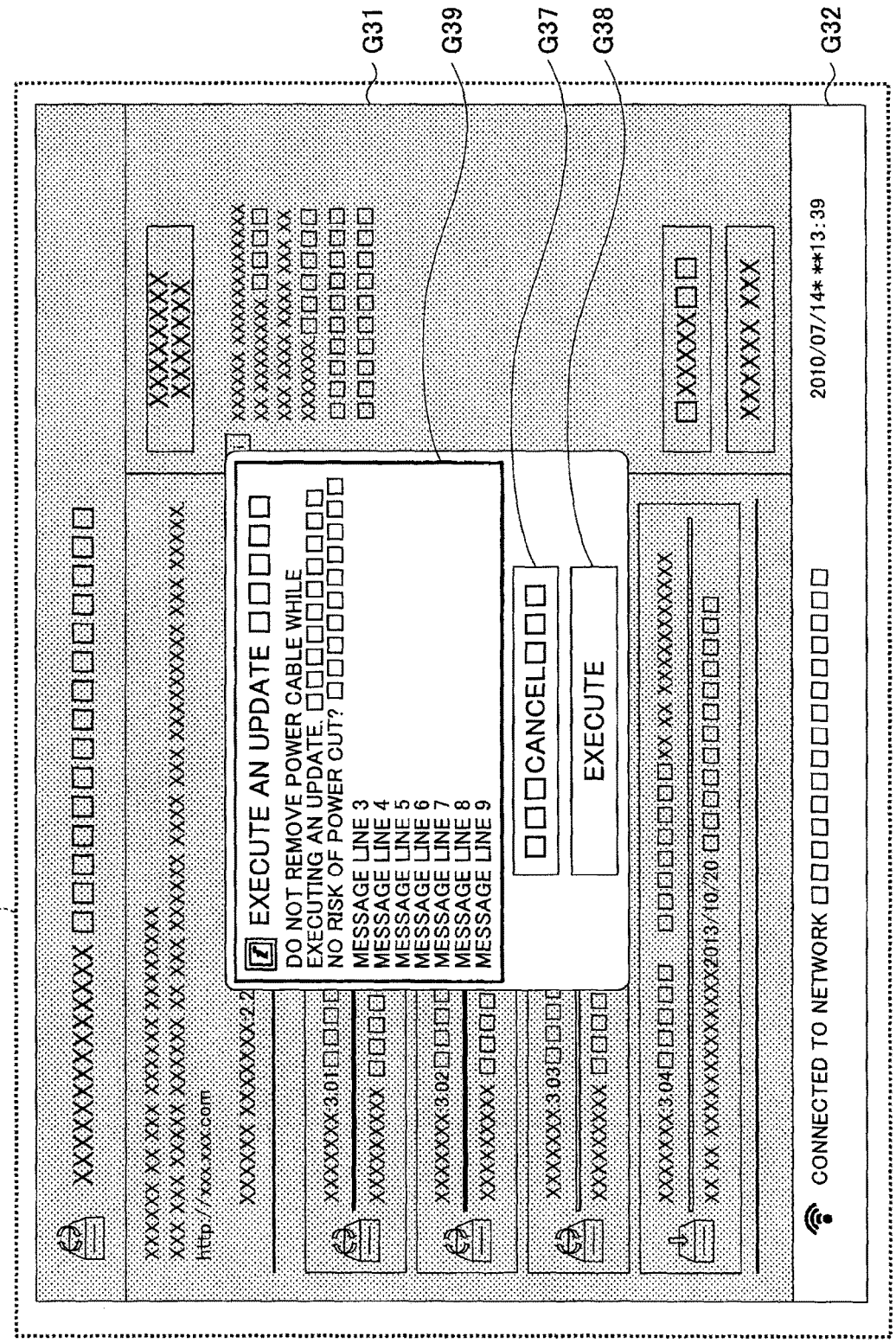
FIG. 11 is a diagram illustrating an example of a verification window.

FIG. 11 is a diagram illustrating an example of a verification window. The update verification screen G3 may further display a verification window G39 to encourage the user to verify the displayed content when the user selects the operation button G38 to give an instruction to execute an update. The verification window G39 may display a notice and the like when a predetermined update is executed in addition to information such as the version number of the version subject to updating. In the update verification screen G3, when the execution of the update is instructed, the verification window G39 may be displayed to attract the user's attention to execute the update. Note that the update verification window G39 may further be configured to display information as to whether to restart the own phone terminal 11.

Referring back to FIG. 5, the update part 1103 determines whether to execute an update based on the user's selecting operation to select the operation button G38 or G38 on the verification screen G3 (step S18). When the user selects the operation button G38 to give an instruction to execute the update (YES in step S18), the update part 1103 executes an update process based on the acquired metadata (step S19).

When the operation button G38 is not selected by the user selecting the operation button G37 to cancel the execution of the update (NO in step S18), the update part 1103 determines whether there is a forced update among the unexecuted updates based on the statement of the "force_update of the acquired metadata (step S20). When there is a forced update (YES in step S20), the update part 1103 ends the process of the own phone terminal 11 (step S21) to switch off the own phone terminal. As described above, when the forced update is not executed, he own phone terminal 11 will not be able to even call. Hence, undesirable operations may be prevented by switching off the power of the phone terminal 11. Conversely, when the forced update is not contained (NO in step S20), the update part 1103 will not execute the update at that time, and the update part 1103 allows the phone terminal 11 to continue to perform normal operations. Hence, the user may be able to prioritize calling rather than updating.

That is, in the phone terminal 11, when there is an update of the own phone terminal 11, the presence of the update is reported to the user from the user reporting part 1104 of the user interface part 1102. Then, the phone terminal 11 receives from the user the selecting operation via the operation input receiver 1105 as to whether to execute that update. When the user performs the selecting operation to execute the update, the update part 1103 executes the update process. Accordingly, when there is an update to be executed in the own phone terminal 11, the phone terminal 11 allows the user to select the execution of that update.

Figure 12:
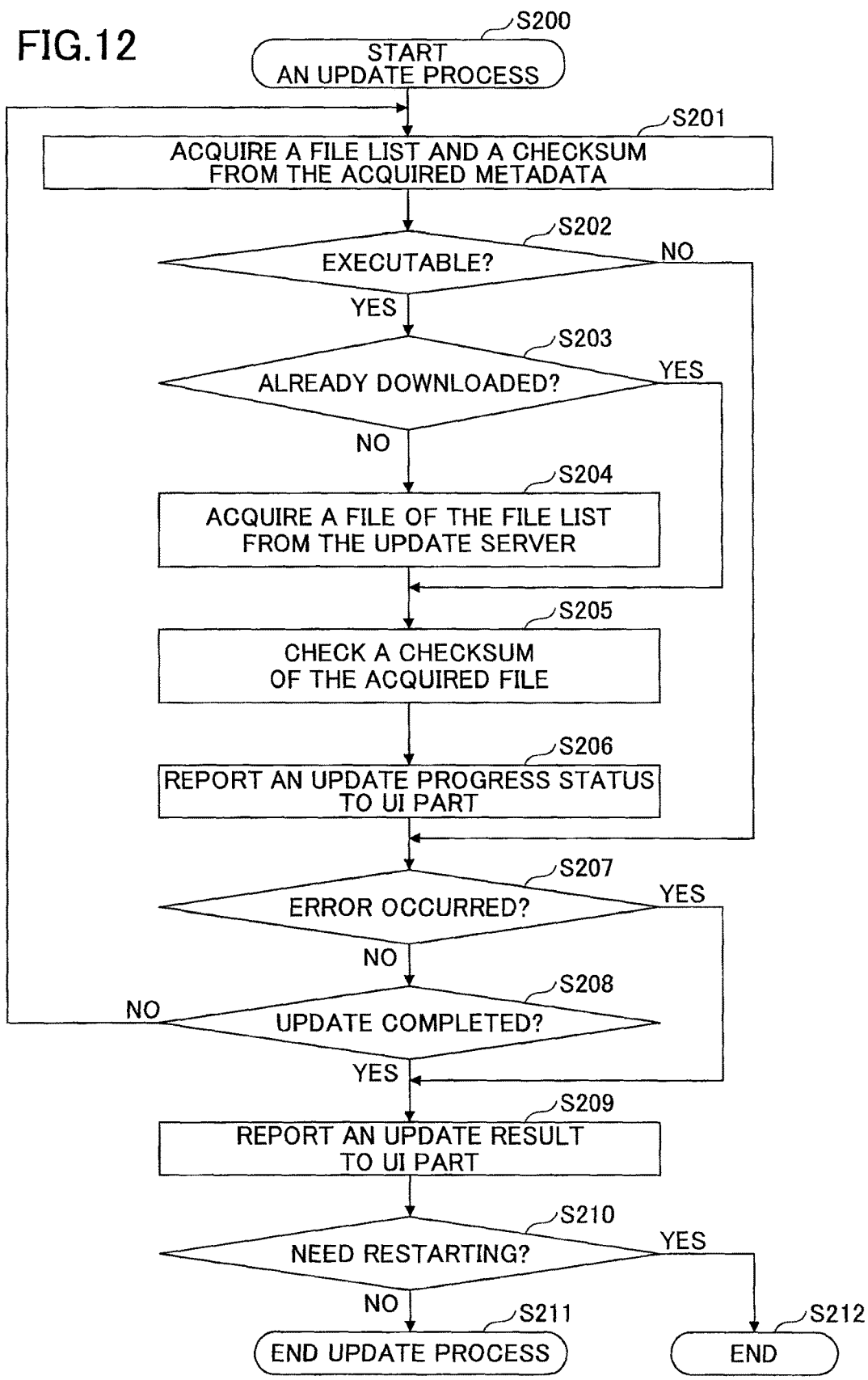
FIG. 12 is a flowchart illustrating an example of an update process of an embodiment.

In the following, a detailed description is given of the update process (step S19). FIG. 12 is a flowchart illustrating an example of an update process of an embodiment. In FIG. 12, the phone terminal 11 receives the metadata having a configuration similar to that illustrated in FIG. 6.

As illustrated in FIG. 12, when the update part 1103 starts an update process (step S200), the update part 1103 deactivates functions of interface parts such as the imaging device I/F 112, the sound input-output I/F 113 and the like used for connecting to external apparatuses such as the camera 12 and the microphone 14. When the interface parts are in activation, the programs 104 associated with the interface parts are being used while updating. Hence, an error may occur to cause failure of the update process. Accordingly, the update part 1103 deactivates the functions of the above-described interface parts along with the start of the update process.

Subsequently, the update part 1103 acquires a file list of the programs serving as an entity of the update and checksums of these files from the "files" of all the acquired metadata (step S201). Note that when the update part 1103 acquires several depended-on versions of the metadata, steps S201 to S208 are performed on the metadata in the order from the oldest version to the latest version.

Subsequently, the update part 1103 determines whether the update is executable or non-executable based on the "isValid" of the metadata (step S202).

When the update part 1103 determines that the update is non-executable (NO in step S202), the update part 1103 proceeds with a process in step S207, and reports to the user interface part 1102 an indication that the update is non-executable. On the other hand, when the update part 1103 determines that the update is executable (YES in step S202), the update part 1103 determines whether those update data are already acquired (step S203).

When the update part 1103 determines that those update data are already acquired (YES in step S203), the update part 1103 verifies the checksums of all the acquired files (i.e., downloaded update data) (step S205). When the update part 1103 determines that those update data are not already acquired in the pre-download process (NO in step S203), the update part 1103 acquires files on the file list from the update server 60 (step S204), and verifies the checksums of the acquired files (step S205).

Subsequently, the update part 1103 reports the update progress status to the user interface part 1102 (step S206). The update progress status report indicates for which files, among the files included in the file list, the update part 1103 has completed the processes in steps 204 and S205. Further, when the update part 1103 executes updates of several versions having dependent relationships, the update progress status report may indicate for which versions the update part 1103 has completed updating. The user interface part 1102 displays the reported update progress status on the screen of the display 13 to report to the user the reported update progress status.

Figure 13:
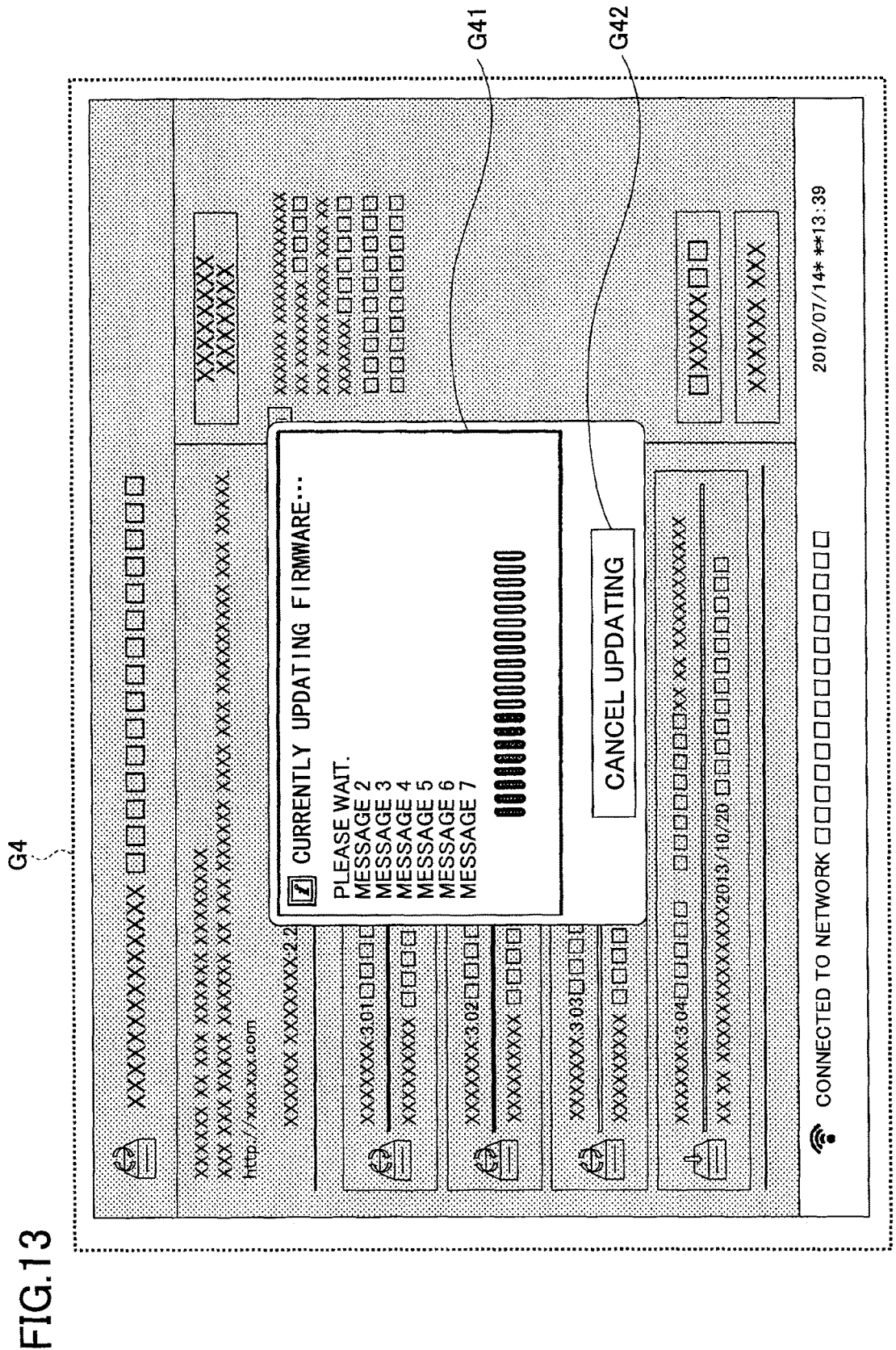
FIG. 13 is a schematic diagram illustrating an example of an update screen.

FIG. 13 is a schematic diagram illustrating an example of an update screen. As illustrated in FIG. 13, the update screen G4 is displayed on the display 13 by the user interface part 1102 during the update process executed by the update part 1103. The update screen G4 is configured to display an update status window G41 to display the update progress status reported by the update part 1103, and an operation button G42 for the user to give an instruction to cancel the update process. The user may be able to check the update progress status based on the displayed content of the update status window G41.

Note that the update screen G4 may further be configured to display a remaining time of the update process or a current line speed on a real-time basis. In this case, the user may be provided with advantage to acknowledge the update status in more detail.

Subsequently, the update part 1103 determines whether an error has occurred (step S207). When the update part 1103 determines that an error has occurred (YES in step S207), the update part 1103 exits a process of steps S201 to S208 to proceed with step S209. In step 207, the update part 1103 determines as an error such as an error occurring due to any of the factors during updating (e.g., mismatched checksums in step S205), cancelling the updating by pressing the operation button G42 on the update screen G4, and restarting required by the version that has been updated in steps S204 and S205. Accordingly, when the update is executed from the earlier version to the latest version, the process of steps S201 to S208 is exited at the stage where the version that requires restarting has been updated.

When no error has occurred (NO in step S207), the update part 1103 determines whether the updates of all the versions associated with the acquired metadata have been completed (step S208). When the update part 1103 determines that the updates of all the versions have not been completed (NO in step S208), the update part 1103 returns to step S201 to continue to perform the update process. When the update part 1103 determines that the updates of all the versions have been completed (YES in step S208), the update part 1103 exits the process of steps S201 to S208 to proceed with step S209.

In step S209, the update part 1103 reports a result of the updating in step S201 to S208 to the user interface part 1102. The user interface part 1102 displays the reported update result on the screen of the display 13 to report to the user the reported update result.

Figure 14:
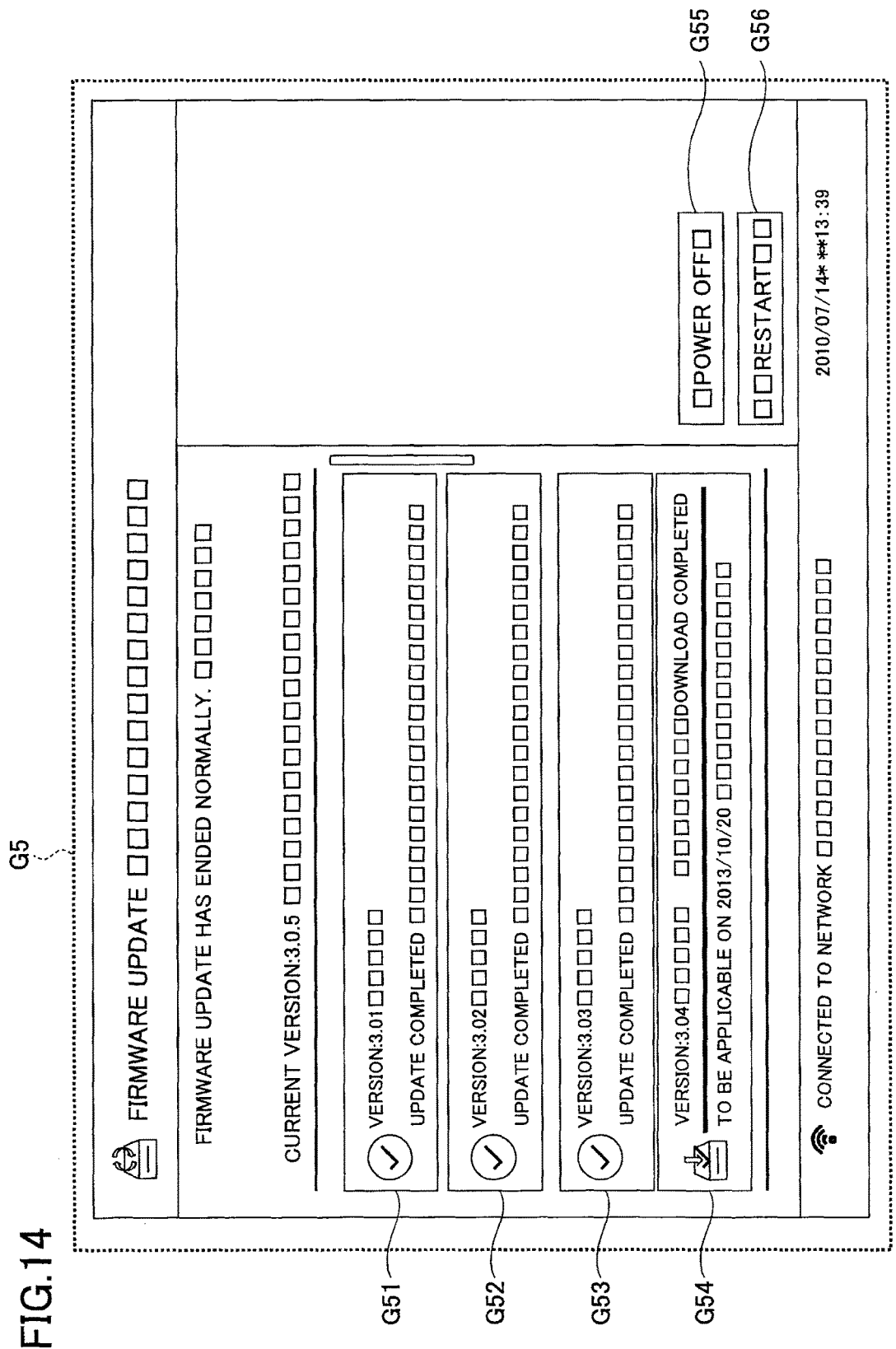
FIG. 14 is another schematic diagram illustrating an example of a verification screen according to an embodiment.

FIG. 14 is another schematic diagram illustrating an example of a verification screen G5 according to an embodiment. The user interface part 1102 that has received the update result displays on the verification screen G5, as illustrated in FIG. 14, update result screens G51 to G54 displayed as results of steps S201 to S209 or operation buttons G55 and G56 for receiving a shutdown operation or a restarting operation after the execution of the update.

As illustrated in FIG. 14, the update result screens G51 to G54 display update results of respective versions. Since the versions "3.01", "3.02", "3.03" are applicable, the update result screens G51 to G53 display respective strings and icons indicating that the update has been completed. On the other hand, since the version "3.04" is not applicable, the update result screen G54 displays a string and an icon indicating that update applicable date and time, and that only the download has been completed.

The user may be able to verify the update results of the respective versions from the above-described displays on the update result screens G51 to G53.

Subsequently, the update part 1103 determines whether restarting is required based on the statement of the "require_reboot" included in the metadata when the update is executed in steps S201 to S208 (step S210). When the update part 1103 determines that restarting is not required (NO in step S210), the update part 1103 ends the update process without restarting (step S211). When the update part 1103 determines that restarting is required (YES in step S210), the update part 1103 ends the process with restarting (step S212). As described above, when the update that requires restarting is executed, the own phone terminal 11 will be restarted without the user's operation after the update has been executed.

Modification

Figure 15:
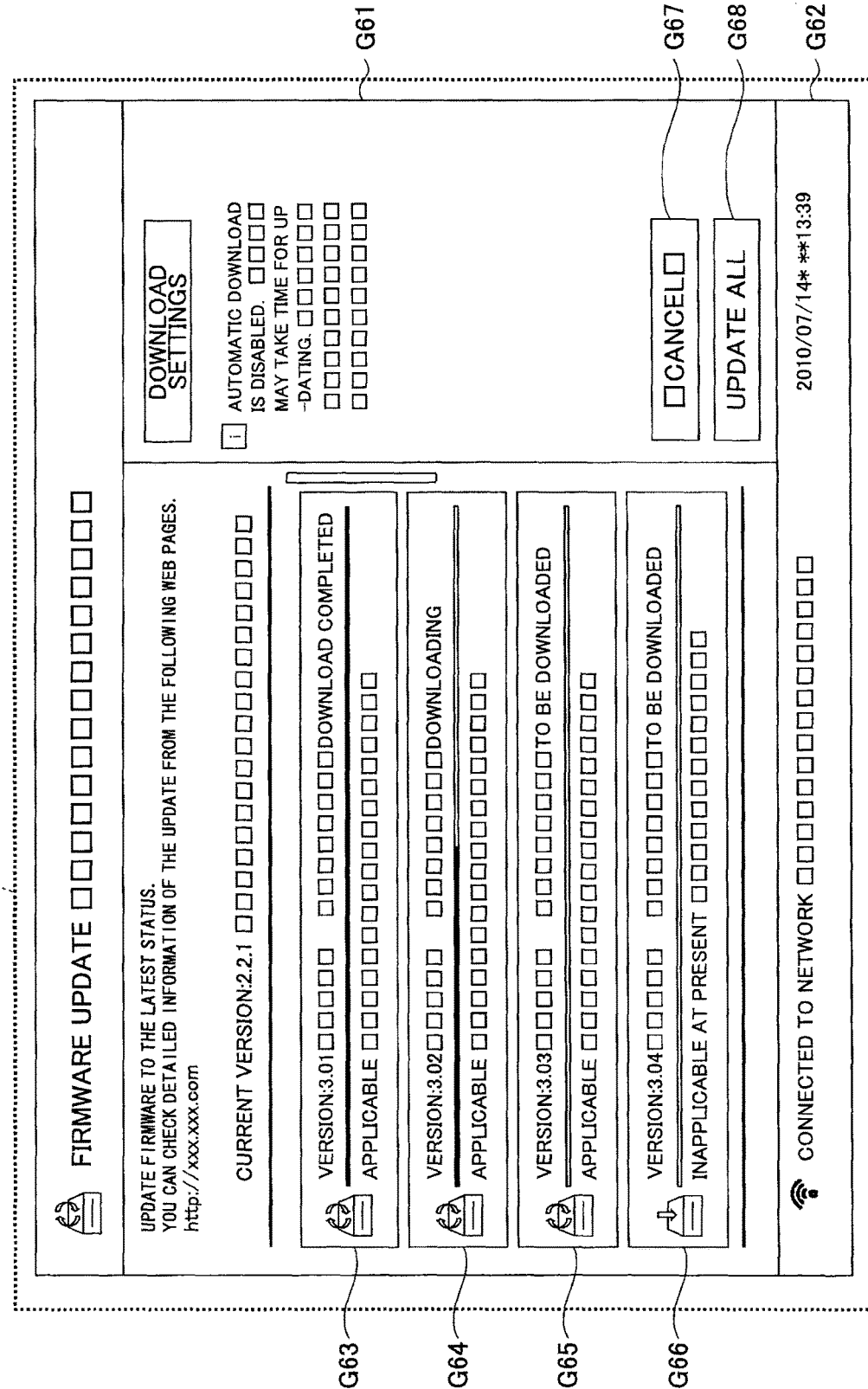
FIG. 15 is a schematic diagram illustrating modification of a verification screen according to an embodiment.
Figure 16:
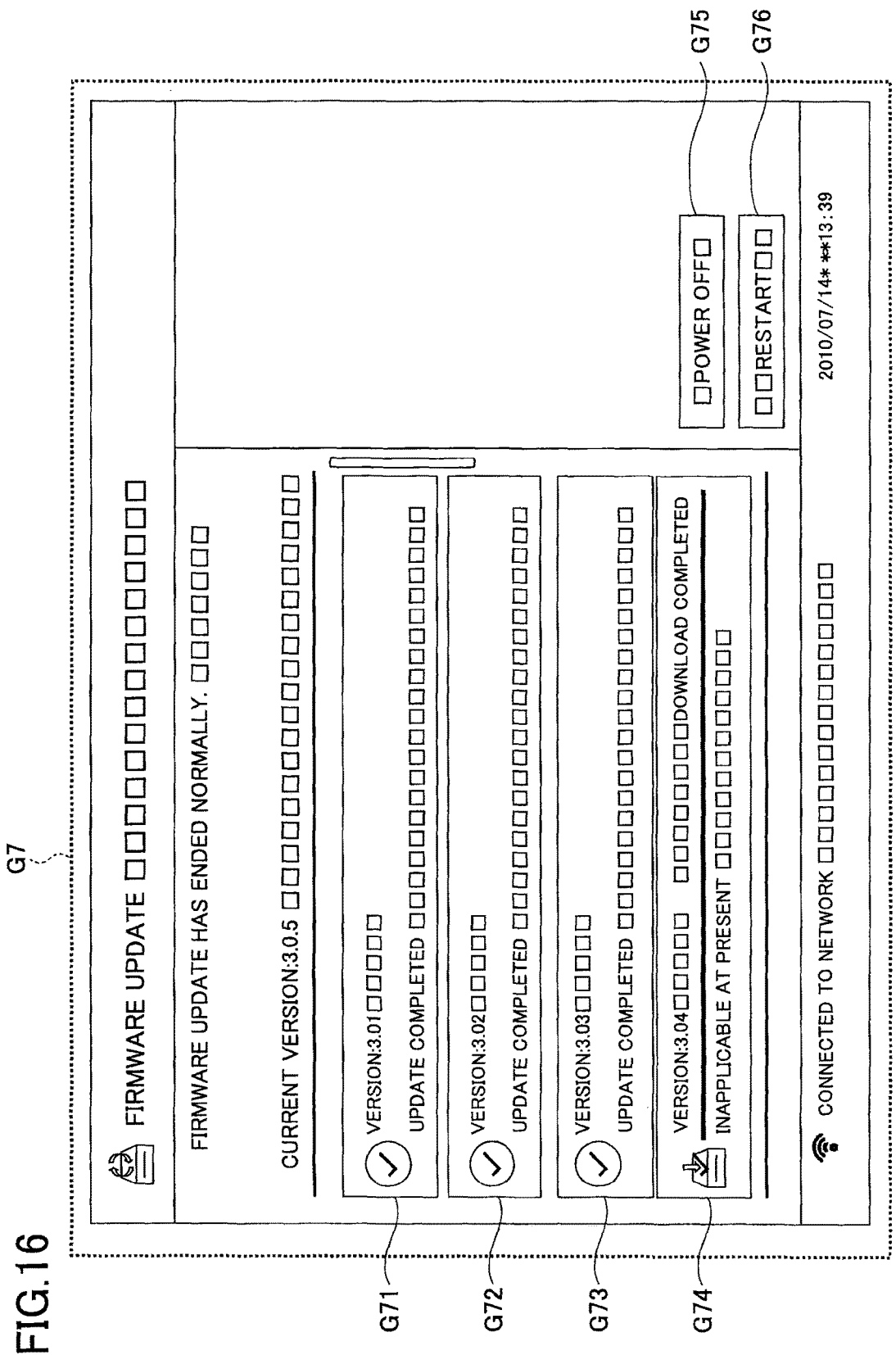
FIG. 16 is another schematic diagram illustrating modification of a verification screen according to an embodiment.

In the following, a description is given of modification of the update verification screen. The modification of the update verification screen describes a case where those updates are unable to be executed at present but are allowed to be executed in the future. Specifically, an illustration is given of an update verification screen displayed by the user reporting part 1104 when specific executable date and time of those updates are unknown. FIG. 15 is a schematic diagram illustrating an example of a verification screen G6 according to one modification of the present embodiment, and FIG. 16 is a schematic diagram illustrating an example of a verification screen G7 according to another modification of the present embodiment.

In the above-described embodiments, the date and time at which the update is executable are known. However, information about the date and time at which the update is executable are not always provided. For example, there may be a case where the update data to be provided with the phone terminal 11 are already prepared, but the date and time at which the server is ready to handle the update data are uncertain (unknown). In this case, when the update server 60 sets "false" at the "isValid" of the metadata, the user reporting part 1104 displays "inapplicable at present" as illustrated in FIGS. 15 and 16.

As described above, the phone terminal 11 may be able to execute the update based on the information indicating whether the update is applicable or not applicable included in the metadata provided from the update server 60. Hence, it may be possible to prevent communication deficiency caused by mismatched versions of software between the phone terminal 11 and the server such as the relay apparatus 30 or the communication management server 50.

Note that all or part of the above-described embodiments and modifications may be implemented by a program. The program may be stored in a portable recording medium. The portable recording medium indicates a non-transitory storage medium. Examples of the portable recording medium include a magnetic recording medium, an optical disk, a magneto-optical recording medium, a nonvolatile recording medium, and the like.

All or part of the above-described embodiments and modifications may be implemented by causing a processor to read the program stored in the portable recording medium and execute the read program.

Note that the arrangements and configurations described as the above embodiments have been described heretofore for the purpose of illustration; however, the present invention should not be limited to the foregoing description of the embodiments. The present invention may be taken into practice by adding various modifications to the foregoing embodiments without departing from the gist of the invention. Further, various types of inventions may be made in appropriate combinations of a plurality of components disclosed in the above embodiments. For example, some of the components may be deleted from all the components described in the above embodiments. Further, the components across the different embodiments may appropriately be combined.

Specifically, the communication system 1 may be a telephone system such as a videophone system, an audio teleconference system, a voice call system, a personal computer (PC) screen sharing system, an Internet protocol (IP) phone system, an Internet phone system, or the like. Further, the communication system 1 may be a remote control system such as a car navigation system. For example, in the car navigation system, one of the phone terminals 11 corresponds to a car navigation apparatus installed on a vehicle, and the other one of the phone terminals 11 corresponds to a management server or a management terminal in a management center that manages the car navigation, or another car navigation apparatus installed on another vehicle. In addition, the communication system 1 may be a content delivery system to deliver electronic data such as images in a movie, a drama, the television and the posted video, and electronic books.

Moreover, the communication management server 50 and the update server 60 in the above embodiments may be formed in a single computer or a plurality of computers to which respective functions and components are appropriately assigned. In addition, when the update server 60 is formed of a single computer, programs transmitted by the update server 60 may be divided into a plurality of modules or the programs may be transmitted without being divided. Further, when the update server 60 is formed of a plurality of computers, the programs may be divided into a plurality of modules and each of the modules may be transmitted from a corresponding one of the computers.

According to the embodiments and modifications, there is provided a communication apparatus, a communication system, and (CN) a communication method/(US&EP) a recording medium storing a communication program capable of executing an update at time where a terminal is allowed to execute the update.

The present invention is not limited to the specifically disclosed embodiments, and variations and modifications may be made without departing from the scope of the present invention.

The present application is based and claims priority of Japanese Priority Application No. 2013-244348 filed on Nov. 26, 2013, the entire contents of which are hereby incorporated herein by reference.

What is claimed is:

1. A communication apparatus, comprising:
a receiver configured to receive metadata, from an update information providing apparatus, including:
first metadata at a first time and second metadata at a second time that is later than the first time, each instance of the received metadata having a same format and including information associated with update of a stored program including:
an update version identifier of the update,
a storage address of update data associated with the update version identifier,
a flag indicating whether the update data associated with the update version identifier is executable or not, and
a depend-on version identifier used to identify a depend-on version on which the update depends, the update data being available to be downloaded in advance before an update executable date; and
processing circuitry configured to, every time any of the metadata is received from the update information providing apparatus:
determine, based on the update version identifier and the depend-on version identifier, whether the depend-on version exists, and when determining that the depend-on version exists, request and download depend-on metadata corresponding to the depend-on version, determine, based on the downloaded depend-on metadata, whether a further depend-on version exists, and if so, request and download further metadata corresponding to the further depend-on version so as to sequentially obtain all depend-on versions that are dependent on the update having the update version identifier;
determine whether new update data is available, by comparing the update version identifier of a latest received metadata with version information of the stored; and
when determining that the new update data is available, determine, based on only a value of the flag in the received first metadata, when receiving the first metadata, and based on only a value of the flag in the received second metadata, when receiving the second metadata, whether the new update data is currently executable by the processing circuitry,
wherein the processing circuitry is further configured to download the update data indicated by the storage address in the first metadata and in all obtained depend-on metadata when the processing circuitry determines, based on the received first metadata, that the update data indicated by the storage address in the first metadata is not currently executable by the processing circuitry, and wherein when the processing circuitry determines that the update process can be executed based on the received second metadata, the processing circuitry downloads all update data indicated by the storage address in the second metadata that was not previously downloaded, and executes the update process using all update data that was previously downloaded when the processing circuitry determined that the update process could not be executed based on the received first metadata and all update data that was downloaded when the processing circuitry determined that the update process could be executed based on the received second metadata.

2. The communication apparatus of claim 1, wherein the processing circuitry is configured to request the metadata upon startup of the communication apparatus.

3. The communication apparatus of claim 1, wherein the processing circuitry is further configured to cause a display to display an indication that the update is necessary and information of the update version identifier, and concurrently, automatically download the update data in the background, when determining, based on the received metadata, that the update data is currently executable by the processing circuitry.

4. The communication apparatus of claim 1, wherein when downloading the update data, the processing circuitry is configured to interrupt the downloading when a user starts to communicate with another communication apparatus.

5. A communication system, comprising:
an update information providing apparatus; and
a communication apparatus, the update information providing apparatus and the communication apparatus being in communication with each other via a data transmission channel,
wherein the update information providing apparatus includes:
a transmitter configured to transmit metadata, to the communication apparatus, including:
first metadata at a first time and second metadata at a second time that is later than the first time, each instance of the transmitted metadata having a same format and including information associated with update of a stored program data including:
an update version identifier of the update,
a storage address of update data associated with the update version identifier,
a flag indicating whether the update data associated with the update version identifier is executable or not, and
a depend-on version identifier used to identify a depend-on version on which the update data depends, the update data being available to be downloaded in advance before an update executable date; and
first processing circuitry configured to change the information associated with the update data included in the metadata, and
wherein the communication apparatus includes:
a receiver configured to receive the metadata from the update information providing apparatus; and
second processing circuitry configured to, every time any of the metadata is received from the update information providing apparatus:
determine, based on the update version identifier and the depend-on version identifier, whether the depend-on version exists, and when determining that the depend-on version exists, request and download depend-on metadata corresponding to the depend-on version, determine, based on the downloaded depend-on metadata, whether a further depend-on version exists, and if so, request and download further metadata corresponding to the further depend-on version so as to sequentially obtain all depend-on versions that are dependent on the update having the update version identifier, and
determine whether new update data is available by comparing the update version identifier of a latest received metadata with version information of the stored program,
when determining that the new update data is available, determine, based on only a value of the flag in the received first metadata, when receiving the first metadata, and based on only a value of the flag in the received second metadata, when receiving the second metadata, whether the new update data is currently executable by the second processing circuitry,
wherein the second processing circuitry is further configured to download the update data indicated by the storage address in the first metadata and in all obtained depend-on metadata, when the second processing circuitry determines, based on the received first metadata, that the update data indicated by the storage address in the first metadata is not currently executable by the second processing circuitry, and
wherein when the second processing circuitry determines that the update process can be executed based on the received second metadata, the second processing circuitry downloads all update data indicated by the storage address in the second metadata that was not previously downloaded, executes the update process using the update data that was previously downloaded when the second processing circuitry determined that the update process could not be executed, based on the received first metadata and all update data that was downloaded when the second processing circuitry determined that the update process could be executed based on the received second metadata.

6. A non-transitory computer readable recording medium having a communication program executed by a computer, the computer being included in a communication apparatus capable of performing communications, wherein whenever executed by the computer, the communication program performs a process comprising:
receiving metadata, from an update information providing apparatus, including:
first metadata at a first time and second metadata at a second time that is later than the first time, each instance of the received metadata having a same format and including information associated with update of a stored program data including:
an update version identifier of the update,
a storage address of update data associated with the update version identifier,
a flag indicating whether the update data associated with the update version identifier is executable or not, and
a depend-on version identifier used to identify a depend-on version on which the update depends, the update data being available to be downloaded in advance before an update executable date;
determining, every time any of the metadata is received from the update information providing apparatus based on the update version identifier and the depend-on version identifier, whether the depend-on version exists, and when determining that the depend-on version exists, request and download depend-on metadata corresponding to the depend-on version, determine, based on the downloaded depend-on metadata, whether a further depend-on version exists, and if so, request and download further metadata corresponding to the further depend-on version so as to sequentially obtain all depend-on versions that are dependent on the update data having the update version identifier;

determine whether new update data is available by comparing the update version identifier of a latest received metadata with version information of the stored program;

when determining that the new update data is available, determining, every time any of the metadata is received based on only a value of the flag in the received first metadata when receiving the first metadata, and based on only a value of the flag in the received second metadata when receiving the second metadata, whether the new update data is currently executable by the computer;

downloading the update data indicated by the storage address in the first metadata and in all obtained depend-on metadata when it is determined, based on the received first metadata, that the update data indicated by the storage address in the first metadata is not currently executable by the computer; and when it is determined that the update process can be executed based on the received second metadata, downloading all update data indicated by the storage address in the second metadata that was not previously downloaded, executing the update process using the all update data that was previously downloaded when the it was determined that the update process could not be executed based on the received first metadata and all update data that was downloaded when it was determined that the update process could be executed based on the received second metadata.

\* \* \* \* \*